US007245473B2

(12) United States Patent
Prelec

(10) Patent No.: US 7,245,473 B2
(45) Date of Patent: Jul. 17, 2007

(54) SWITCHABLE LIGHTNING ARRESTER SYSTEM

(76) Inventor: Michael L. Prelec, 4175 Highway 11, Deland, FL (US) 32724

( * ) Notice: Subject to any disclaimer, the term of this patent is extended or adjusted under 35 U.S.C. 154(b) by 610 days.

(21) Appl. No.: 10/677,010

(22) Filed: Sep. 30, 2003

(65) Prior Publication Data

US 2005/0068708 A1 Mar. 31, 2005

(51) Int. Cl.
*H02H 1/00* (2006.01)

(52) U.S. Cl. .................................................... 361/131

(58) Field of Classification Search ................ 361/126, 361/127, 131, 132; 174/137 R, 5 SG, 145, 174/158 R, 163 R; 337/168, 172, 173, 174, 337/175, 193, 194, 195

See application file for complete search history.

(56) References Cited

U.S. PATENT DOCUMENTS

| | | | | |
|---|---|---|---|---|
| 1,873,499 | A * | 8/1932 | Steinmayer | 361/124 |
| 2,060,514 | A * | 11/1936 | Matthews et al. | 337/146 |
| 2,296,991 | A | 9/1942 | Fox | |
| 2,464,565 | A * | 3/1949 | Evans et al. | 361/132 |
| 2,672,539 | A * | 3/1954 | Steinmayer | 337/175 |
| 3,117,192 | A * | 1/1964 | Owens | 200/48 R |
| 3,614,700 | A | 10/1971 | Beard | |
| 4,450,425 | A | 5/1984 | Manning | |
| 4,546,341 | A | 10/1985 | McNaghten et al. | |
| 4,688,013 | A | 8/1987 | Nishikawa | |
| 4,795,996 | A | 1/1989 | Brown et al. | |
| 4,814,550 | A | 3/1989 | Newberg | |
| 4,857,879 | A * | 8/1989 | Morgan | 337/173 |
| 4,947,148 | A | 8/1990 | MacDonald | |
| 5,485,136 | A * | 1/1996 | Johnson et al. | 337/168 |
| 5,574,613 | A * | 11/1996 | Shirakawa et al. | 361/117 |
| 5,773,777 | A * | 6/1998 | Scherer | 218/1 |
| 5,805,046 | A * | 9/1998 | Hassler et al. | 337/168 |
| 6,392,861 | B1 * | 5/2002 | Trinh et al. | 361/117 |
| 6,462,639 | B1 * | 10/2002 | Farag et al. | 337/172 |

* cited by examiner

*Primary Examiner*—Ronald W. Leja
(74) *Attorney, Agent, or Firm*—The Livingston Firm; Edward M. Livingston; Angela M. Miller

(57) ABSTRACT

The switchable lightning-arrester system has a safety-switchable connector (10), which, for differing power-line features, can include optionally a counter-lever safety connector (14), a slide safety connector (40), a hinged safety connector (56) and a pivot safety connector (67) intermediate a power line (11) and a lightning arrester (1) for on-spot disconnection to protect workers from self-destructing arresters when changing lightning arresters or working on damaged lines without costly, time-consuming and power-disruptive shutdown of power lines. This is highly important because the lightning arresters are changed and repair work is done on damaged lines as quickly after self-destruction from lightning surges as possible requiring the change and repair. The safety-switchable connectors are made to be operable and changeable from a safe distance remotely, which is preferably from a ground position near a light pole, a transformer or other line support (9). Many line-worker lives have been injured or lost in the past without this safety-switchable connector.

32 Claims, 20 Drawing Sheets

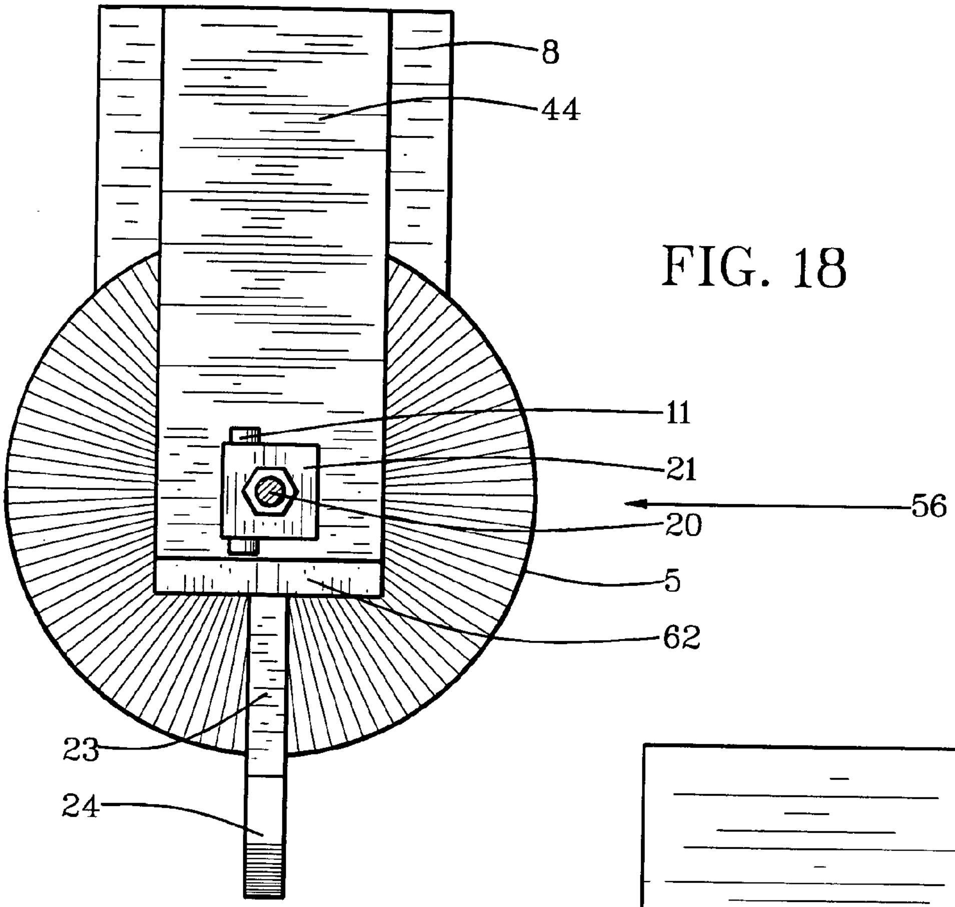
FIG. 18
FIG. 19
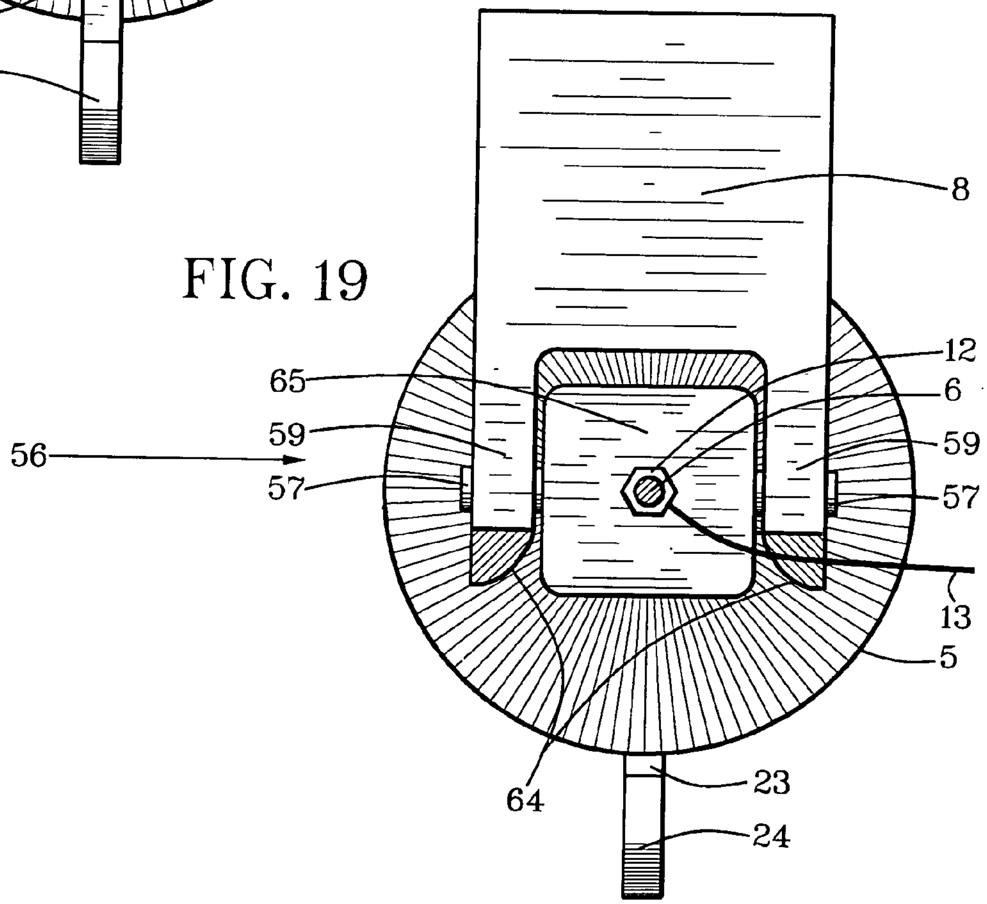

SWITCHABLE LIGHTNING ARRESTER SYSTEM

BACKGROUND OF THE INVENTION

This invention relates to switchable contact of lightning arresters to power lines on power poles and on or near transformers.

Currently, the most commonly used lightning arresters on power poles and on or near transformers are not designed to continue to operate repeatedly after nearly all lightning strikes, but to be sacrificial with designedly predetermined self-destruction from lightning electrical surges in excess of design amounts which are most typically 10 KV.

After sacrificial self-destruction, the lightning arresters must be replaced promptly at high risk by line workers. The high risk results from not shutting down power lines to a self-destructed lightning arrester while line workers electrically connect a replacement lightning arrester to a power line in order to avoid interruption of electrical service to residential and commercial power users and in order to save high power-plant costs. For initial installation of lightning arresters, power to power lines and transformers can be delayed until the lightning arresters are installed. Shutdown of a power line is expensive and time consuming for single and separate replacement of lightning arresters because (a) high power-plant-employee costs in addition to power-line workers are required and (b) shutdown for a single power line or transformer often requires shutdown of branched power lines to a plurality of users. Accordingly, power-line workers are often under employment pressure to avoid injury-preventive shutdowns for replacing single lightning arresters. Generally, the replacement can be accomplished safely, but serious injury and death of line workers result frequently from unexpected electrical surges and from accidental occurrences during replacement and electrical-line contact of the lightning arresters without safety shutdowns.

There is no known switchable lightning-arrester system for allowing replacement of lightning arresters with safe electrical connection to a power line without interrupting electrical service and without expensive power-plant shutdown of power in a manner taught by this invention.

Examples of most-closely related known but different devices are described in the following patent documents:

| U.S. Pat. No. | Inventor | Issue Date |
|---|---|---|
| 2,296,991 | Fox | Sep. 29, 1942 |
| 3,614,700 | Beard, et al. | Oct. 19, 1971 |
| 3,497,148 | MacDonald | Aug. 07, 1990 |
| 4,688,013 | Nishikawa | Aug. 18, 1987 |
| 4,546,341 | McNaghten, et al. | Oct. 08, 1985 |
| 4,795,996 | Brown, et al. | Jan. 03, 1989 |
| 4,814,550 | Newberg | Mar. 21, 1989 |
| 4,450,425 | Manning | May 22, 1984 |

SUMMARY OF THE INVENTION

Objects of patentable novelty and utility taught by this invention are to provide safe, quick, convenient and inexpensive line work and replacement of lightning arresters following lightning damage; and to provide optional utilization or non-utilization of conventional power-line structure and technology of lighting arresters with the safety-switchable lightning-arrester system.

This invention accomplishes these and other objectives with a switchable lightning-arrester system having a safety-switchable connector which can include a counter-lever safety connector, a slide safety connector, a hinged safety connector or a pivot safety connector intermediate a power line and a lightning arrester for on-spot disconnection to protect workers from self-destructing arresters when changing lightning arresters or working on damaged lines without costly, time-consuming and power-disruptive shutdown of power lines. This is highly important because the lightning arresters are changed and repair work is done on damaged lines as quickly after self-destruction from lightning surges as possible when lightning storms are very likely to still exist in the area requiring the change and repair. The safety-switchable connectors are made to be operable and changeable from a safe distance remotely, which is preferably from a ground position near a light pole, a transformer or other line support. Many line-worker lives have been lost in the past without this safety-switchable connector.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 18 is a top view of the FIG. 16 illustration;

FIG. 19 is a bottom view of the FIG. 16 illustration;

DESCRIPTION OF PREFERRED EMBODIMENT

Figure 1:
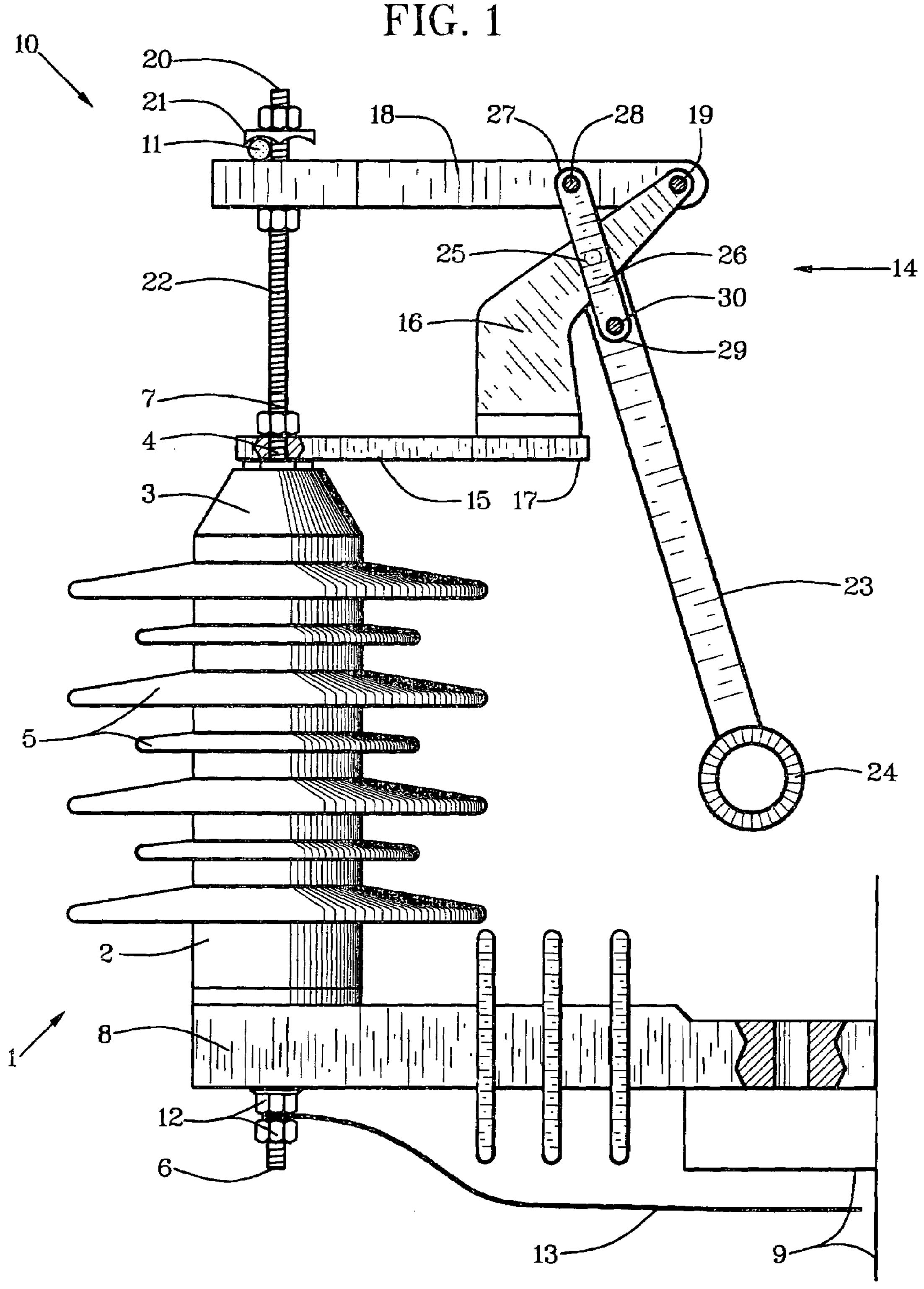
FIG. 1 is a partially cutaway side elevation view of a closed mode of a counter-lever embodiment of the switchable lightning-arrester system having a counter-lever safety switch and mounted on an arrester-attachment base for attachment to a power-line support that can include transformers and light posts and for operation from an attachment side.
Figure 2:
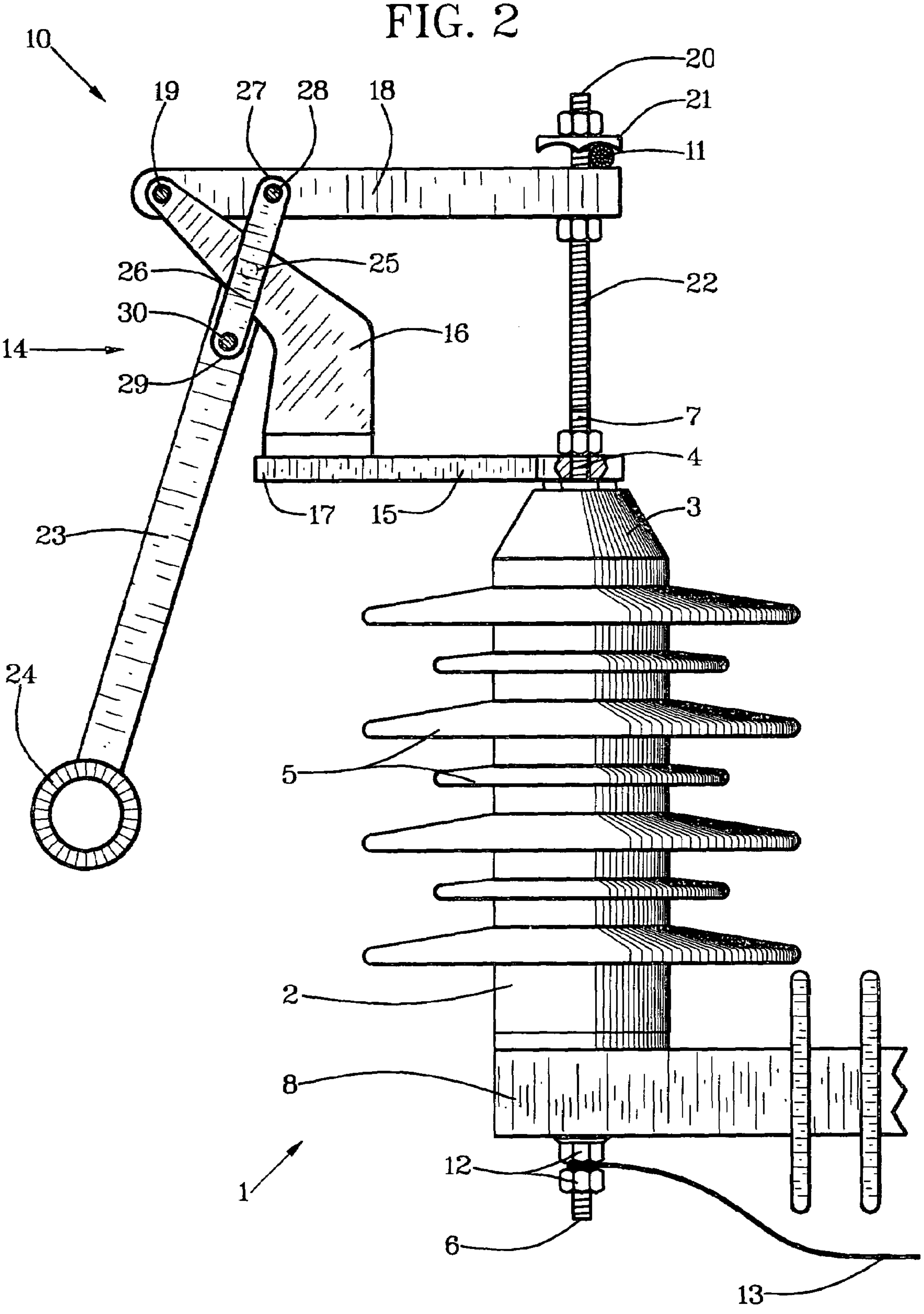
FIG. 2 is a partially cutaway side elevation view of the counter-lever embodiment mounted on the attachment base for operation from a different side than the attachment side.
Figures 3, 4:
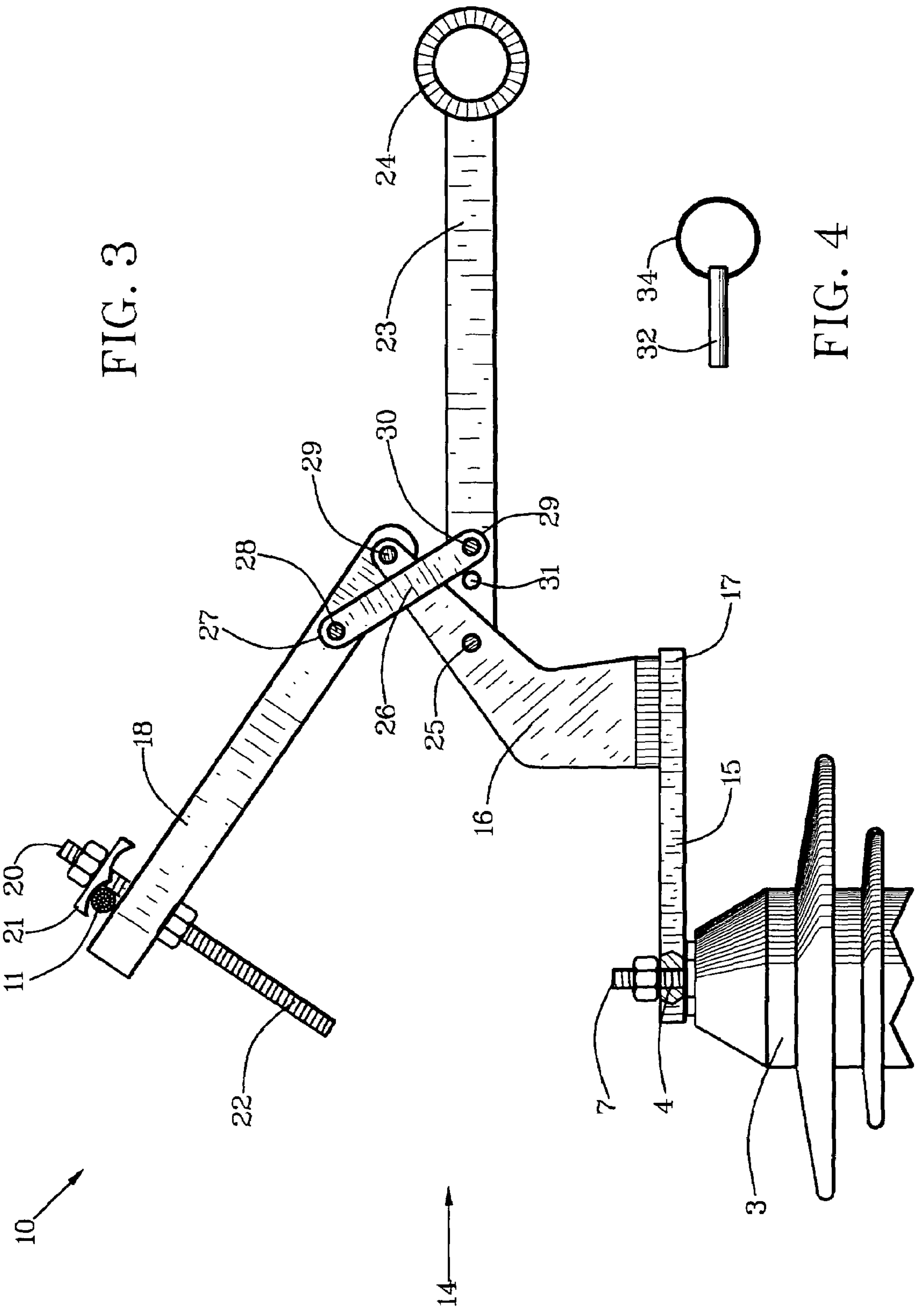
FIG. 3 is a partially cutaway side elevation view of a top portion of the counter-lever embodiment in an open mode.
FIG. 4 is a side view of an open-lock pin.
Figure 5:
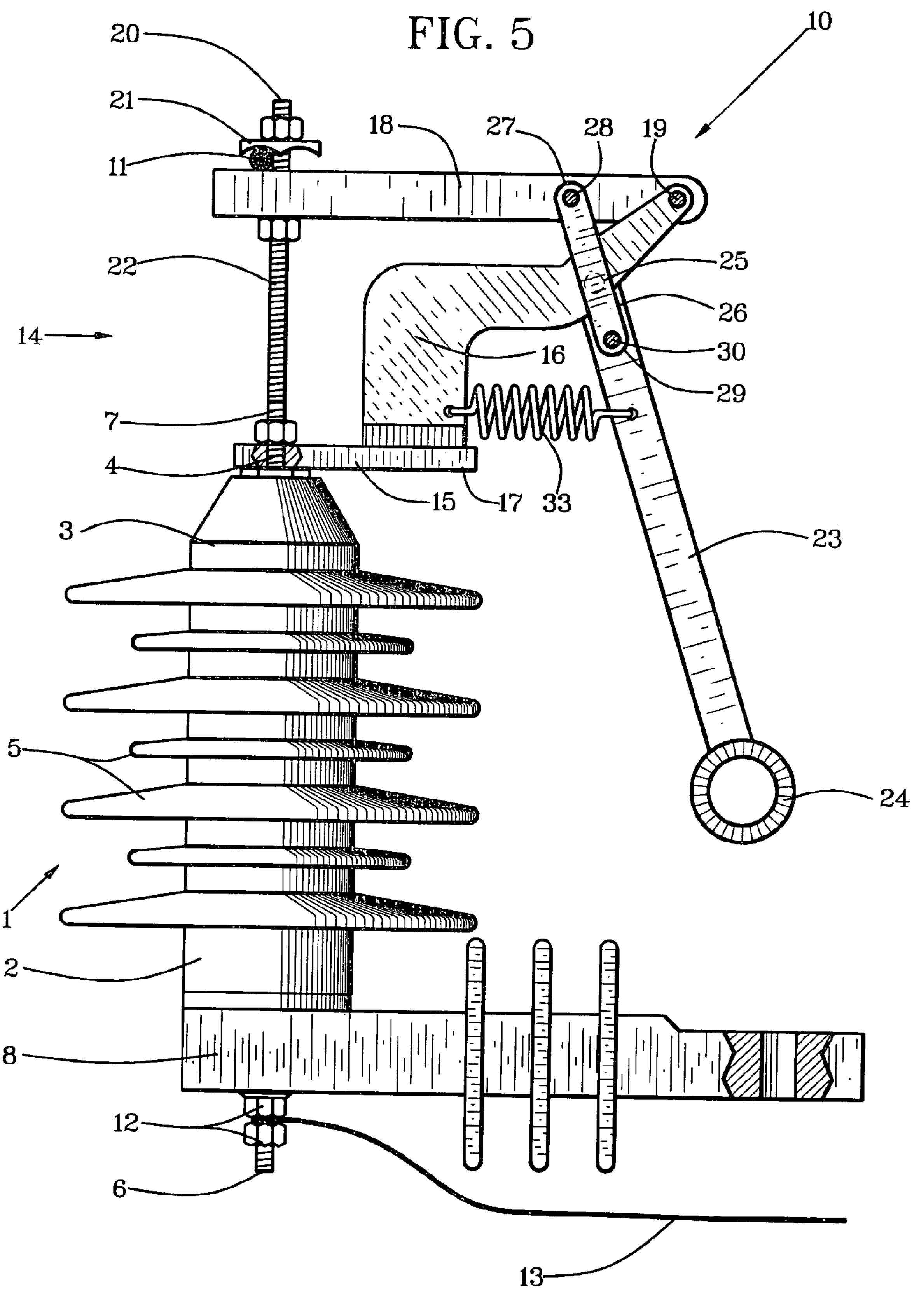
FIG. 5 is a partially cutaway side elevation view of the counter-lever embodiment for use of a remote actuator that includes a contraction-force spring.
Figure 6:
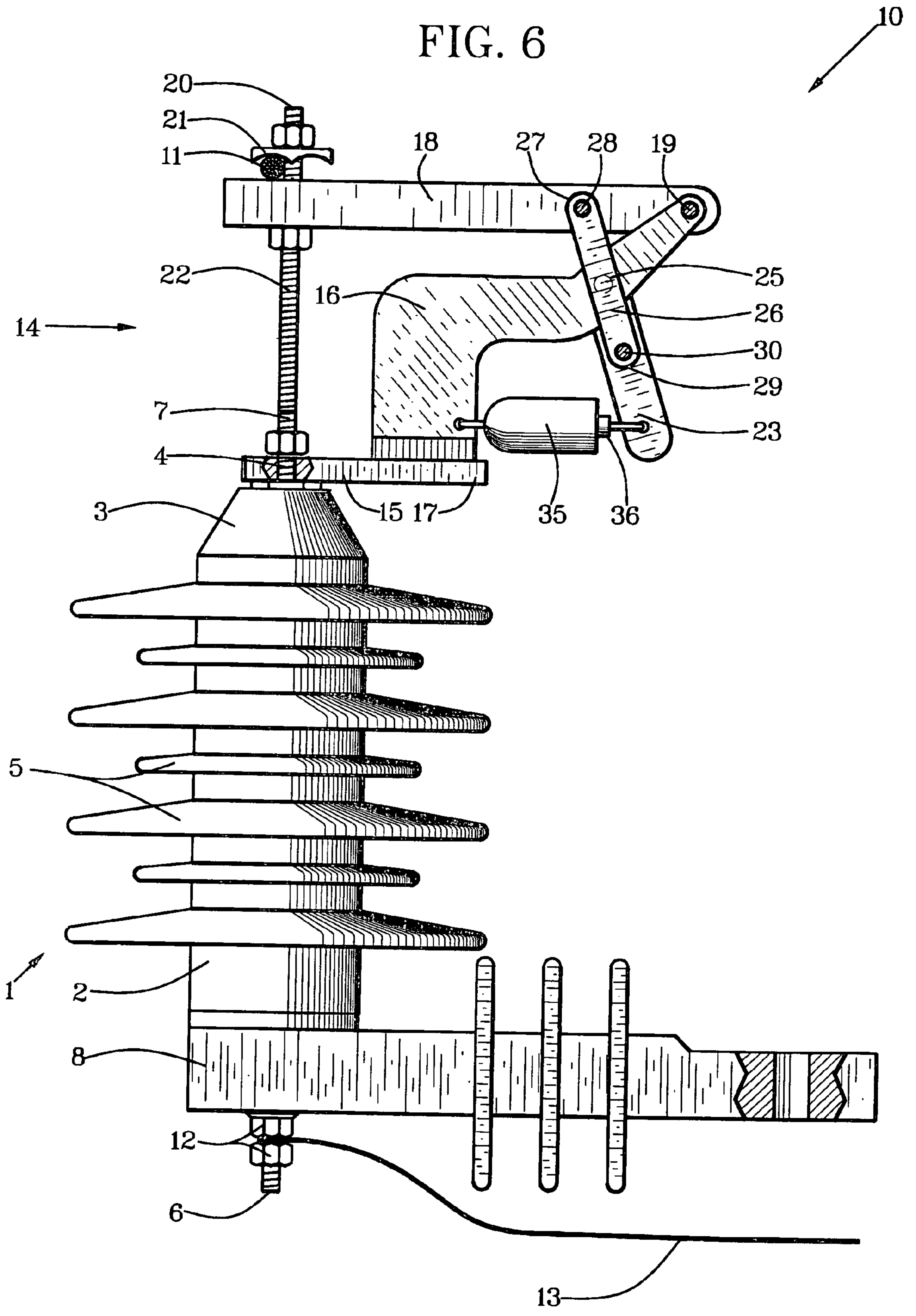
FIG. 6 is a partially cutaway side elevation view of the counter-lever embodiment for use of a remote actuator that includes a remote-control motor having a linear-actuation bar.
Figure 7:
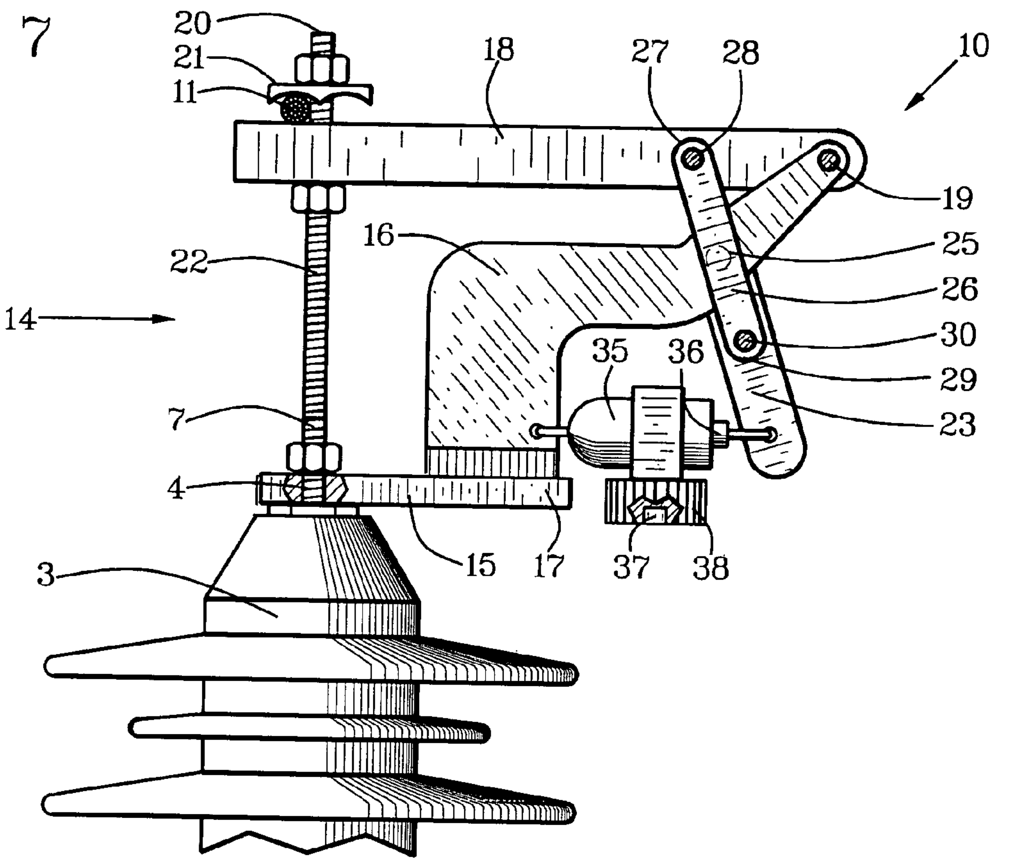
FIG. 7 is a partially cutaway side elevation view of a top portion of the counter-lever embodiment for optionally hand or remote-tool operation.
Figure 8:
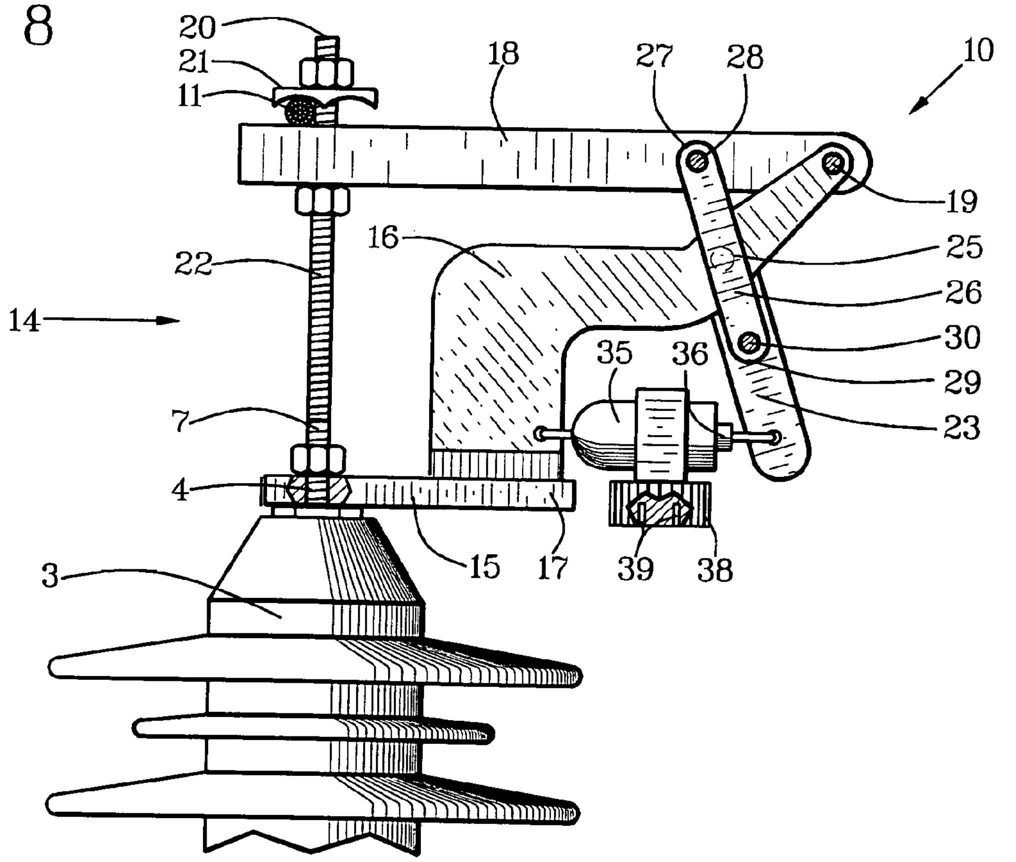
FIG. 8 is a partially cutaway side elevation view of a top portion of the counter-lever embodiment for optionally hand or remote-electrical operation and being in a closed mode.

Listed numerically below with reference to the drawings are terms used to describe features of this invention. These terms and numbers assigned to them designate the same features throughout this description.

1. Lightning arrester
2. Base end
3. Power-line end
4. Link bolt
5. Arrester fins
6. Ground end
7. Terminal end
8. Arrester-attachment base
9. Power-line support
10. Safety-switchable connector
11. Power line
12. Ground-line connector
13. Ground line
14. Counter-lever safety switch
15. Switch platform
16. Fulcrum pillar
17. Pillar end
18. Line-support arm
19. Support-arm axle
20. Switch-rod end
21. Power-line clamp -continued 22. Switch rod
23. Control lever
24. Control-lever handle
25. Control-lever axle
26. Control-link rod
27. First link-rod end
28. First link axle
29. Second link-rod end
30. Second link axle
31. Open-lock aperture
32. Open-lock pin
33. Contraction-force spring
34. Pin ring
35. Remote-control motor
36. Linear-actuation bar
37. Wrench socket
38. Hand knob
39. Electrical socket
40. Slide safety switch
41. Slide platform
42. Slide-fulcrum pillar
43. Slide pillar
44. Line-support platform
45. Slide aperture
46. Slide rod
47. Connection insert
48. Slide-rod axle
49. Lever-link rod
50. Lever-link axle
51. Connector-side pillar groove
52. Lever-side pillar groove
53. Slide groove
54. Pillar stop
55. Lever stop
56. Hinged safety switch
57. Hinge rod
58. Hinge bay
59. Bifurcation arms
60. Handle base
61. Latch knob
62. Spring latch
63. Latch stop connector
64. Arcuate guides
65. Hinge-rod base
66. Support connector
67. Pivot safety switch
68. Connector base
69. First connector boss
70. Second connector boss
71. Connector plug
72. Pivot member
73. Pivot axle
74. Tapered sides
75. Tapered ends
76. Support pillar Referring to FIGS. 1-8, the switchable lightning-arrester system can include counter-lever-switchable connection with a lightning arrester 1 having a base end 2, a power-line end 3 and a link bolt 4 positioned internally from arrester fins 5. The link bolt 4 has a ground end 6 proximate the base end 2 and a terminal end 7 proximate the power-line end 3. An arrester-attachment base 8 is provided for receiving the base end 2 of the lightning arrester 1 for attaching the lightning arrester 1 to a power-line support 9.

A safety-switchable connector 10 proximate the power-line end 3 of the line bolt 4 is articulated for open and closed switching of electrical communication from a power line 11 to the link bolt 4 and to a ground-line connector 12 proximate the ground end 6 of the link bolt 4 for connecting a ground line 13 to the line bolt 4.

The safety-switchable connector 10 can include a counter-lever safety switch 14 having a switch platform 15 to which the terminal end 7 of the link bolt 4 is attached. A fulcrum pillar 16 is extended vertically upward from a pillar end 17 of the switch platform 15. A line-support arm 18 is attached pivotally to a support-arm axle 19 proximate a top of the fulcrum pillar 16. The line-support arm 18 is extended from proximate the support-lever axle 19 to a switch-rod end 20.

A power-line clamp 21 on the switch-rod end 20 is positioned vertically above the link bolt 4 in a closed mode of the counter-lever safety switch 14. A switch rod 22 is extended downward vertically from the line-support arm 18 for contacting the terminal end 7 of the link bolt 4 in a closed mode of the counter-lever safety switch 14. The support-arm axle 19 is positioned horizontally on the fulcrum pillar 16 at a control-fulcrum distance upwardly from the switch platform 15.

A control lever 23 having a control-lever handle 24 is attached pivotally to the fulcrum pillar 16 with a control-lever axle 25. A control-link rod 26 has a first link-rod end 27 attached pivotally to the line-support arm 18 with a first link axle 28. The control-link rod 26 has a second link-rod end 29 attached pivotally to the control lever 23 with a second link axle 30.

The control-link rod 26 is articulated and positioned intermediate the line-support arm 18 and the control lever 23 for transmitting downwardly locking force on the line-support arm 18 from downward travel of the control lever 23 and for transmitting upwardly unlocking force on the line-support arm 18 from upward travel of the control lever 23 as transmitted to the control-lever handle 24 selectively. The control-link rod 26 transmits a lock-shut mode of the counter-lever safety switch 14 with the switch rod 22 being in contact with the terminal end 7 of link bolt 4 by positioning of the first link axle 28, the second link axle 30 and the control-lever axle 25 in a straight line for transmitting lightning power to the ground line 13 for a use mode of the lightning arrester 1.

The control-lever handle 24 can be articulated for hand-grasping and for selectively remote grasping with a control rod.

The support-arm axle 19 is positioned a predetermined distance in a direction away from the pillar end 17 of the switch platform 15 for causing a predetermined central-actuation slant of the control lever 23, below which opening of the counter-lever safety switch 14 with upward travel of the switch rod 22 is prevented by offsetting leverage.

An open-lock aperture 31 is articulated and positioned in the control lever 23 for receiving an open-lock pin 32 for preventing downward travel of the control-link rod 26 and thereby preventing unintended downward actuation of the control lever 23.

The counter-lever safety switch 14 can include a remote actuator intermediate the fulcrum pillar 16 and the control lever 23 for remote actuation of the control lever 23 predeterminedly.

The remote actuator can include a contraction-force spring 33 in combination with the open-lock aperture 31 that is articulated and positioned in the control lever 23 for receiving the open-lock pin 32 for preventing downward travel of the control-link rod 26 and thereby preventing unintended downward actuation of the control lever 23 by the contraction-force spring 33.

The open-lock pin 32 can include a remotely accessible pin ring 34.

The remote actuator can include a remote-control motor 35 having a linear-actuation bar 36 extended from the remote-control motor 35 to pivotal contact with the control lever 23 for actuating the linear-actuation bar 36 outwardly in a direction away from the fulcrum pillar 16 for opening and inwardly in a direction towards the fulcrum pillar 16 for closing the counter-lever safety switch 14.

The remote-control motor 35 can include a wrench socket 37 for rotation with a socket wrench.

The remote-control motor 35 can include a hand knob 38 for hand rotation.

The remote-control motor 35 can include an electrical socket 39 for receiving electrical current.

Referring to FIGS. 9-13, the switchable lightning-arrester system can include slide-switchable connection with the lightning arrester 1 having the base end 2, the power-line end 3 and the link bolt 4 positioned internally from arrester fins 5 of the lightning arrester 1. The link bolt 4 has the ground end 6 proximate the base end 2 and the terminal end 7 proximate the power-line end 3. The arrester-attachment base 8 receives the base end 2 of the lightning arrester 1 for attaching the lightning arrester 1 to the power-line support 9.

The safety-switchable connector 10 proximate the power-line end 3 of the link bolt 4 for open and closed switching of electrical communication from the power line 11 to the link bolt 4 can include a slide safety switch 40 having a slide platform 41 to which the terminal end 7 of the link bolt 4 is attached detachably. Included also can be the ground-line connector 12 proximate the ground end 6 of the link bolt 4 for connecting the ground line 13 to the link bolt 4.

The slide-fulcrum pillar 42 is extended vertically upward from a pillar end of the slide platform 41. A slide pillar 43 is extended vertically upward from the slide platform 41 intermediate the slide-fulcrum pillar 42 and the link bolt 4. A line-support platform 44 is attached pivotally to a top of the slide pillar 43. The power-line clamp 21 is attached to a top of a line-support platform 44 with the switch rod 22 for holding the power line 11.

The slide pillar 43 has a slide aperture 45 for receiving a slide rod 46 having a connection insert 47 on a first end and a slide-rod axle 48 on a second end.

The connection insert 47 is articulated to contact a bottom end of the switch rod 22 and the terminal end 7 of the link bolt 4 for conveying lightning current to the lightning arrester 1.

A lever-link rod 49 is positioned intermediate the slide rod 46 and the control lever 23 with a first end of the lever-link rod 49 attached pivotally to the slide-rod axle 48 and a second end of the lever-link rod 49 attached pivotally to the control lever 23 with a lever-link axle 50;

The control lever 23 is attached pivotally to the slide-fulcrum pillar 42 with the control-lever axle 25.

The switch rod 22 is extended downward vertically from the line-support platform 44 for contacting the connection insert 47 with the slide safety switch 40 being in a closed-circuit mode with the control lever 23 oriented pivotally for sliding the slide rod 46 in opposite directions selectively.

The control-lever axle 25 is positioned predeterminedly above the slide platform 41 for allowing the control-lever 23 to be pivoted with the control-lever handle 24 being raised above a horizontal attitude of the control lever 23 for sliding the slide rod 46 and thereby moving the connection insert 47 out of contact with the terminal end 7 and the switch rod 22 for breaking circuitry of the counter-lever safety switch 14 or optionally with the control-lever handle 24 being lowered below the horizontal attitude of the control lever 23 for sliding the slide rod 46 and thereby moving the connection insert 47 out of contact with the terminal end 7 and the switch rod 22 for breaking circuitry of the counter-lever safety switch 14 with the lever-link rod 49 having a double-end pivotal contact with the slide rod 46 and the control lever 23.

Figure 9:
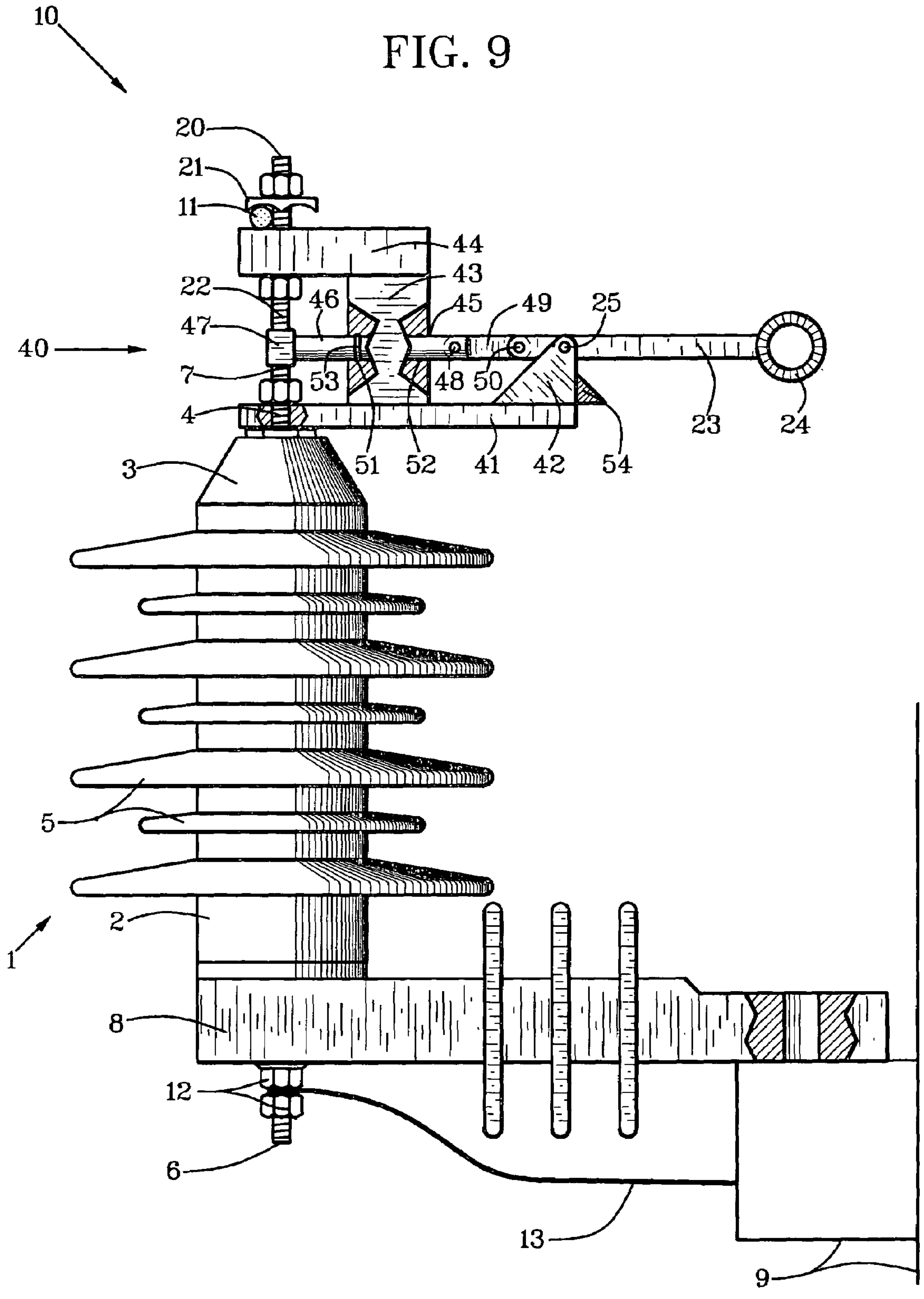
FIG. 9 is a partially cutaway side elevation view of a closed mode of an embodiment of the switchable lightning-arrester system having a slide safety switch with a connection insert that is opened and closed from a lever side of a slide connector.
Figure 10:
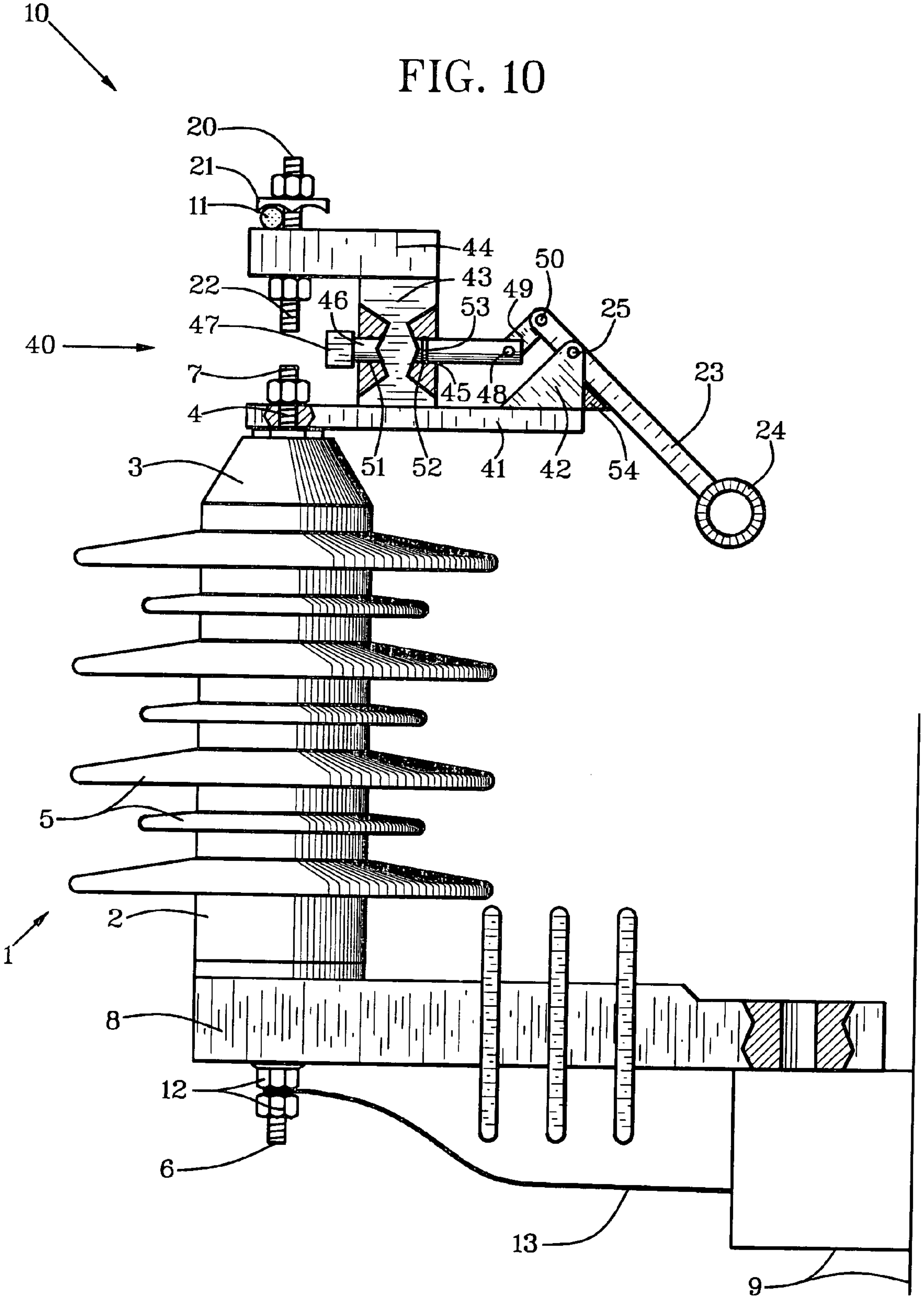
FIG. 10 is a partially cutaway side elevation view of an open mode of the FIG. 9 illustration.

As shown in FIGS. 9-10, the slide rod 46 can include an inwardly opening length for positioning the connection insert 47 in a closed mode of the counter-lever safety switch 14 with the connection insert 47 in electrical communication with the terminal end 7 and the switch rod 22 by positioning of the control lever 23 and the lever-link rod 49 collinearly in line and for positioning the connection insert 47 inwardly towards the slide pillar 43 by optionally upward or downward pivoting of the control lever 23.

Figure 11:
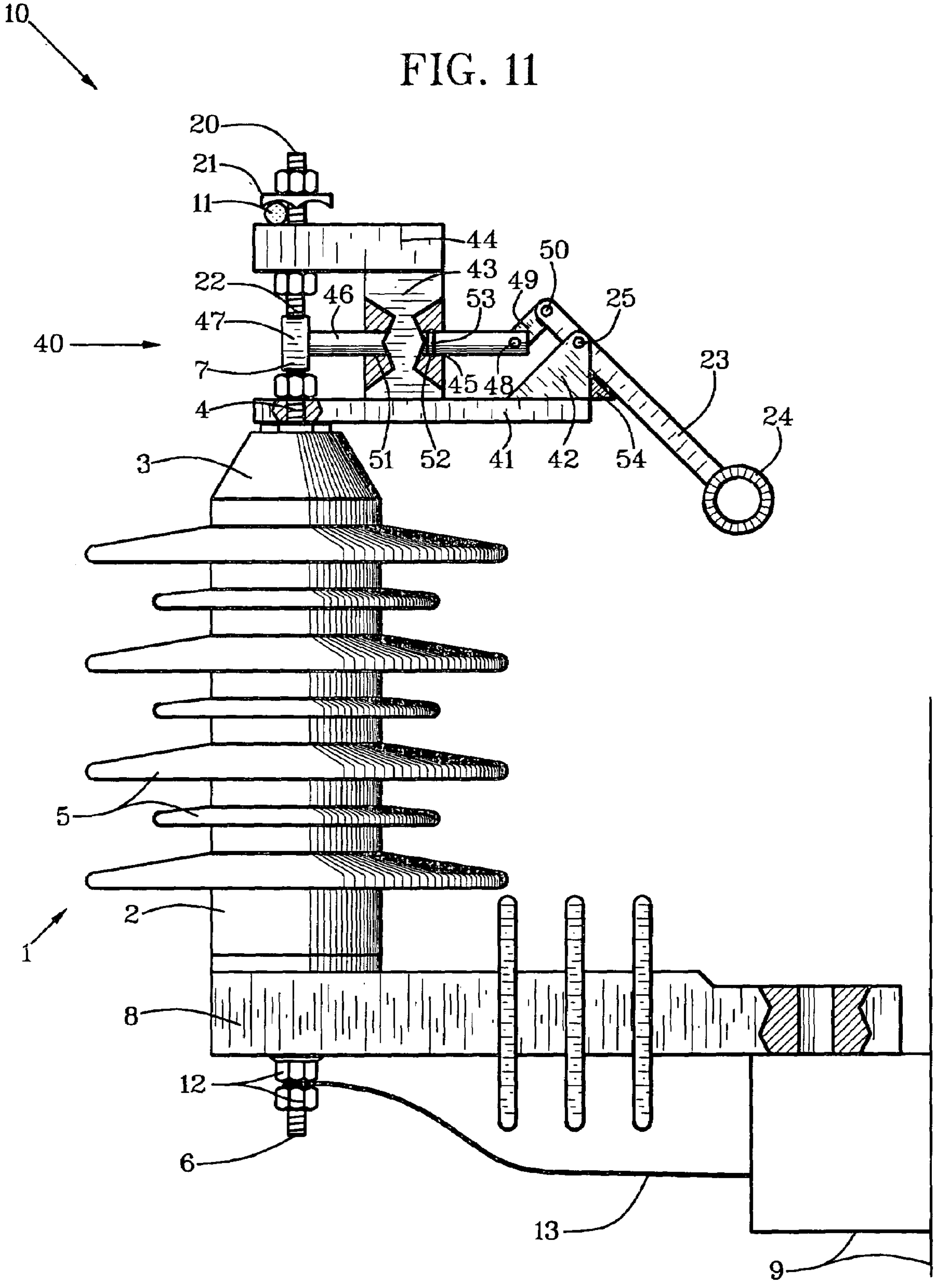
FIG. 11 is a partially cutaway side elevation view of a closed mode of an embodiment of the switchable lightning-arrester system having a slide safety switch with a connection insert that is opened and closed from opposite a lever side of the slide connector.
Figure 12:
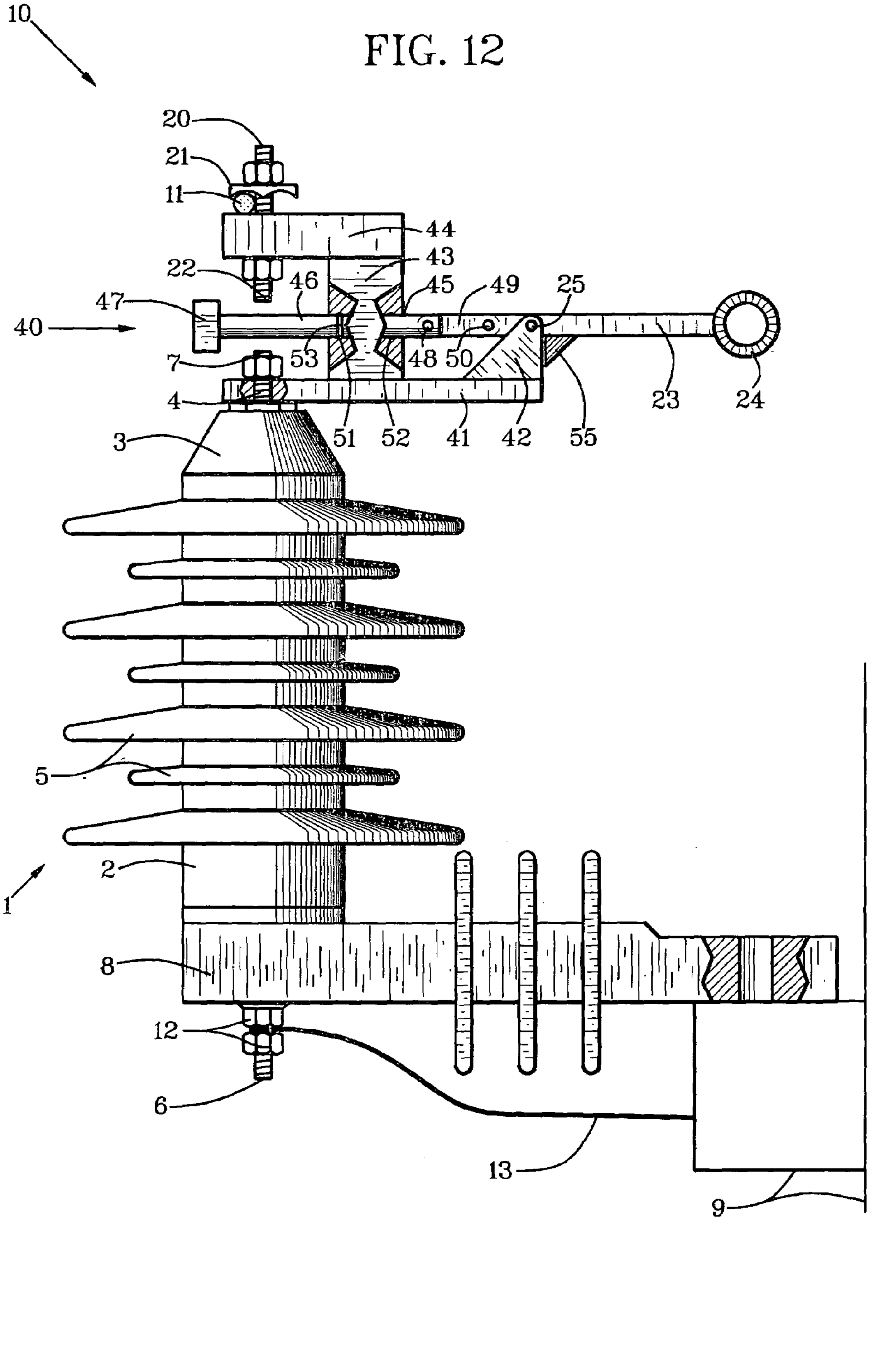
FIG. 12 is a partially cutaway side elevation view of an open mode of the FIG. 11 illustration.
Figure 13:
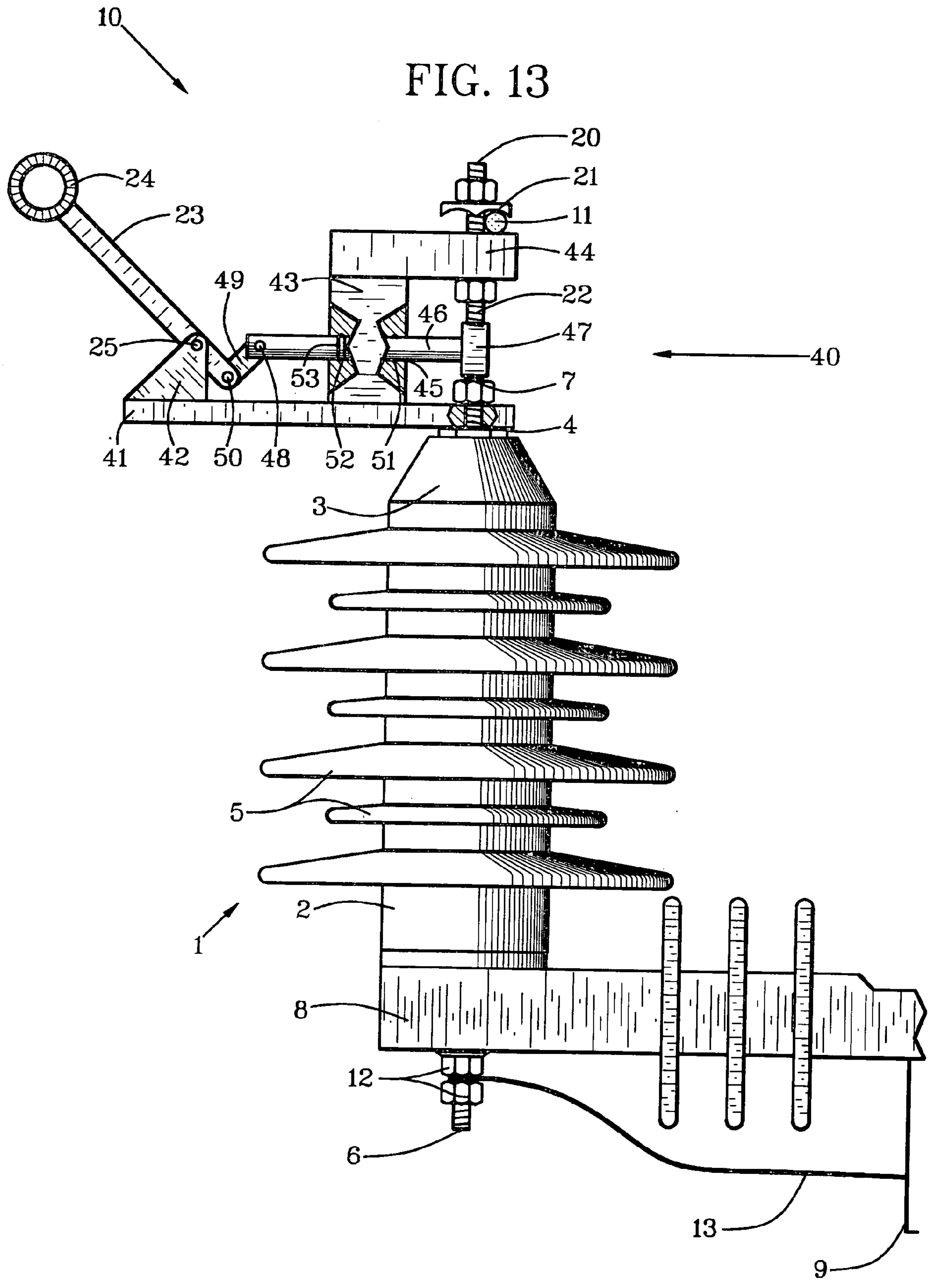
FIG. 13 is a partially cutaway side elevation view of a closed mode of the FIG. 11 illustration with the control lever being on an opposite of the lightning arrester and with the control lever pivotal upwardly to the closed mode.
Figure 14:
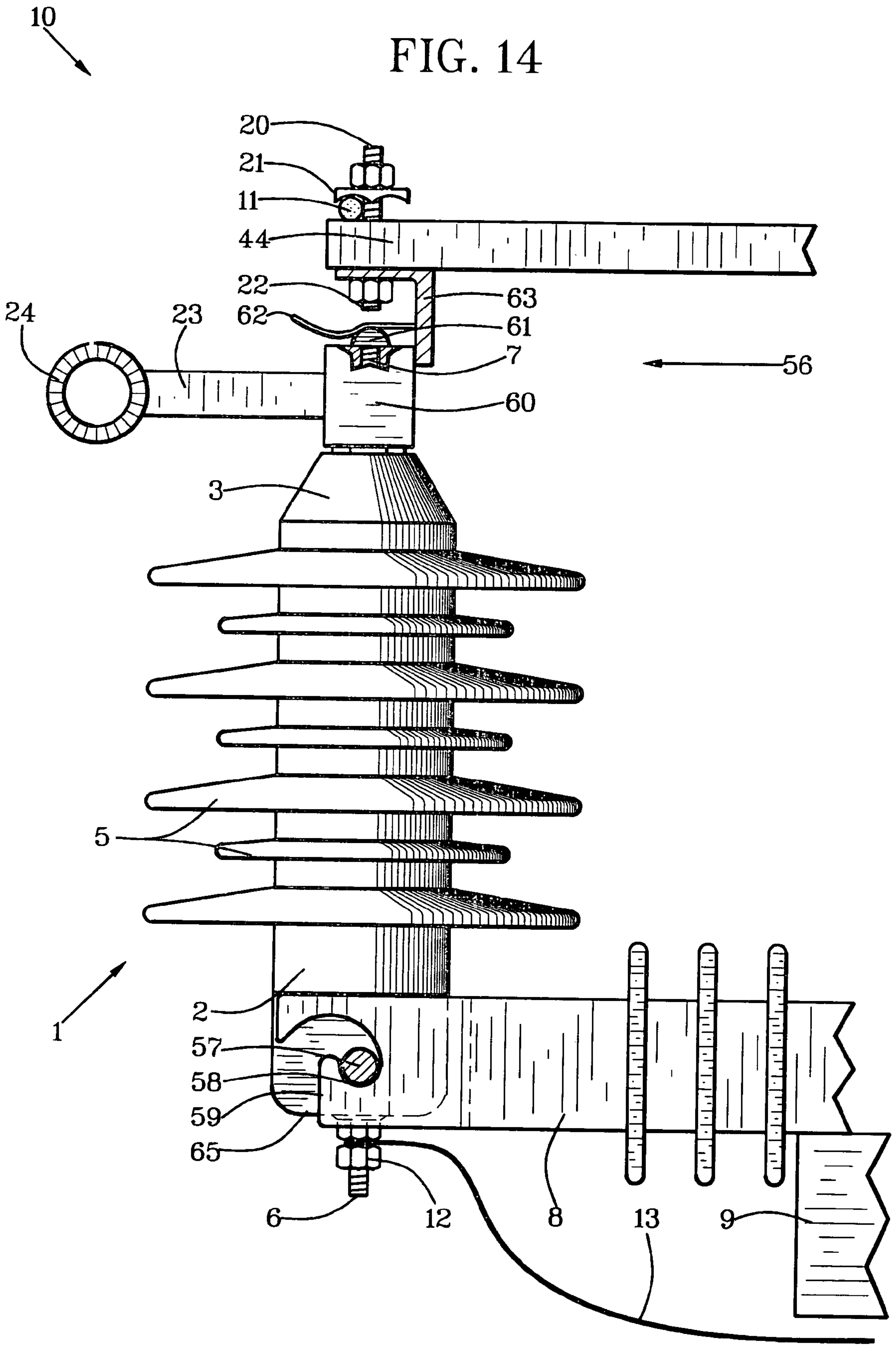
FIG. 14 is a partially cutaway side elevation view of a closed mode of an embodiment of the switchable lightning-arrester system having a hinged safety switch on a hinge rod in a hinge bay.
Figure 15:
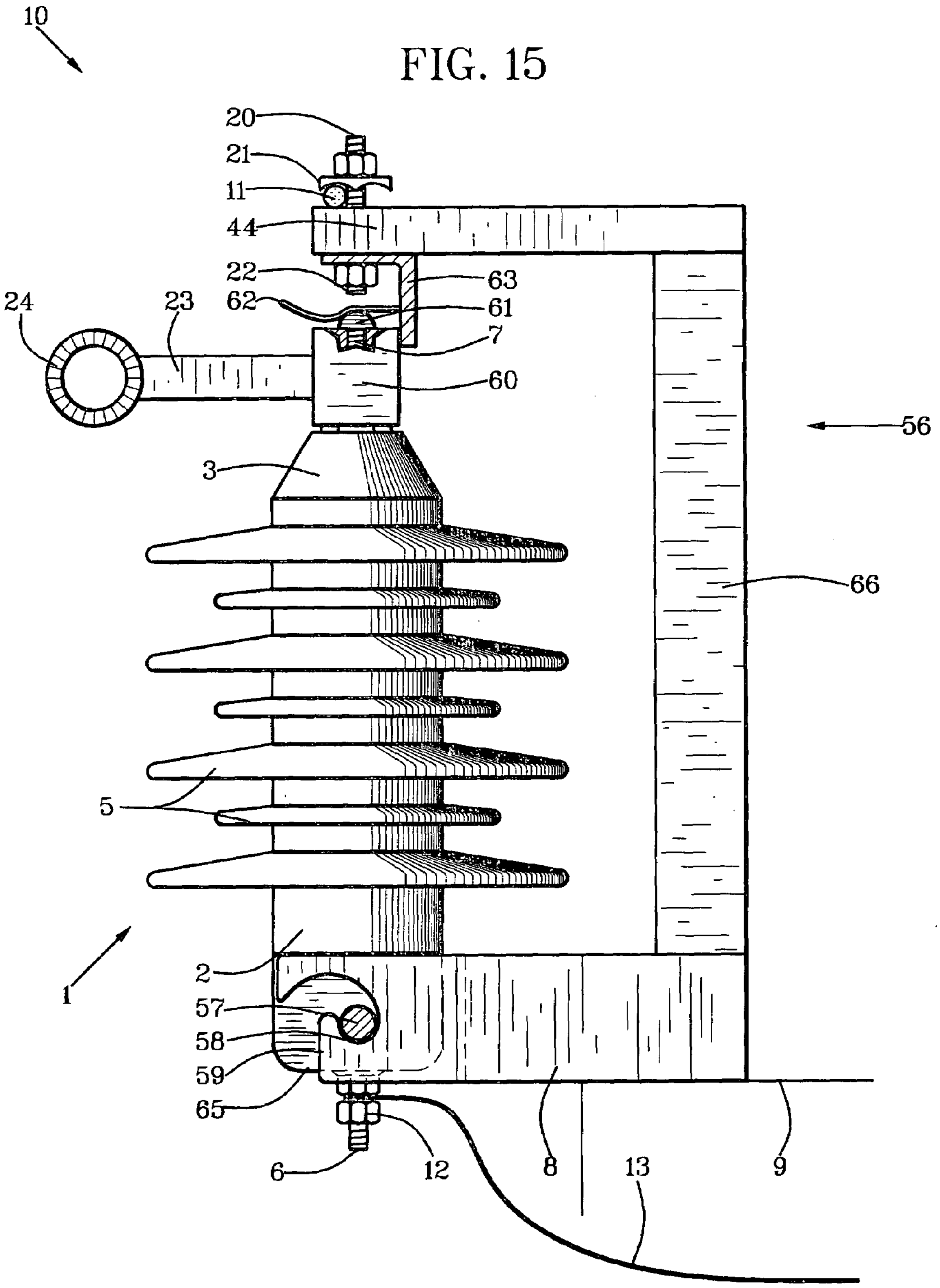
FIG. 15 is a partially cutaway side elevation view of the FIG. 14 illustration; having a support connector for connecting an arrester-attachment base to a line-support platform independently of a power-line support or pole.
Figure 16:
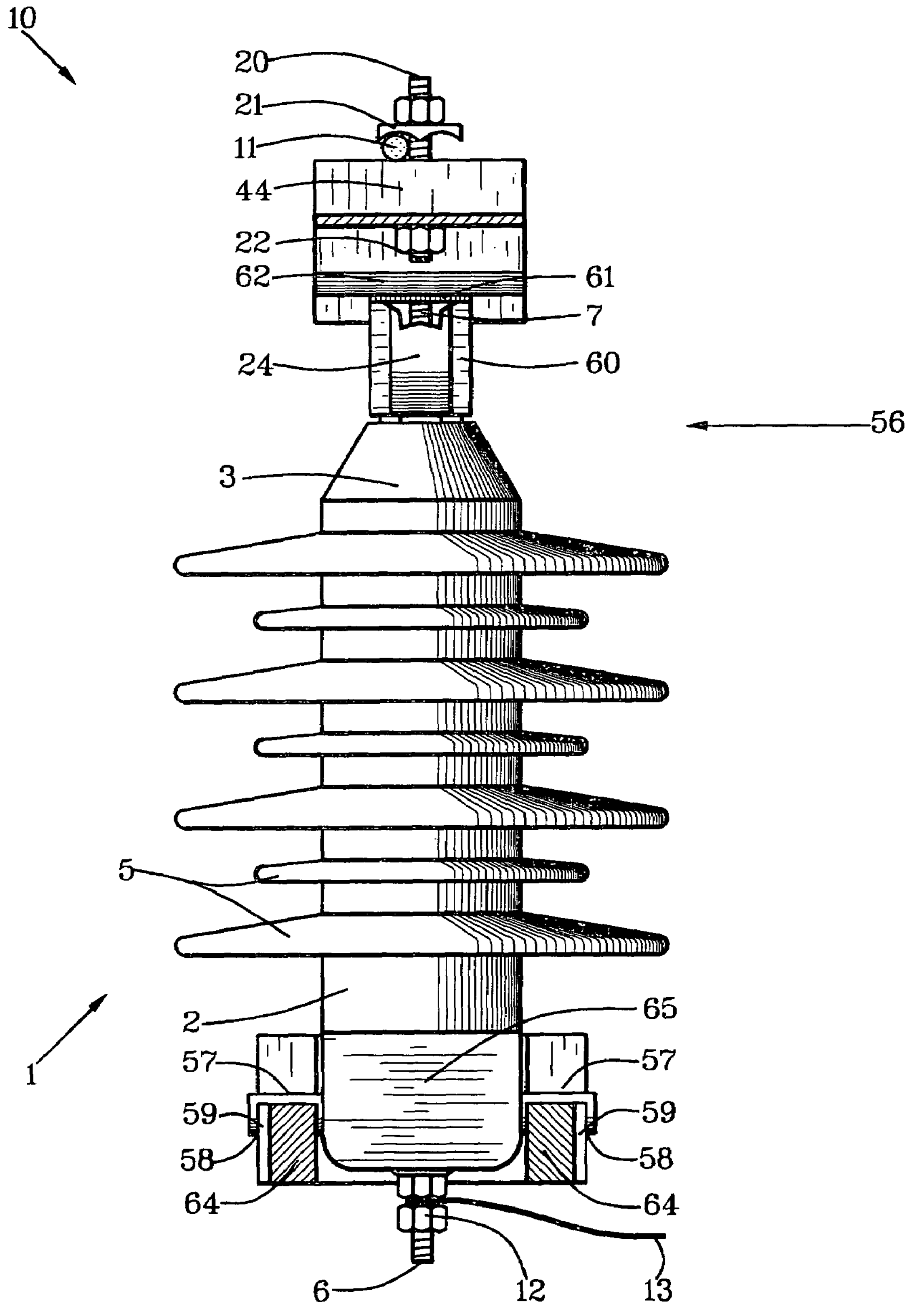
FIG. 16 is a partially cutaway front elevation view of the FIG. 14 illustration.
Figure 17:
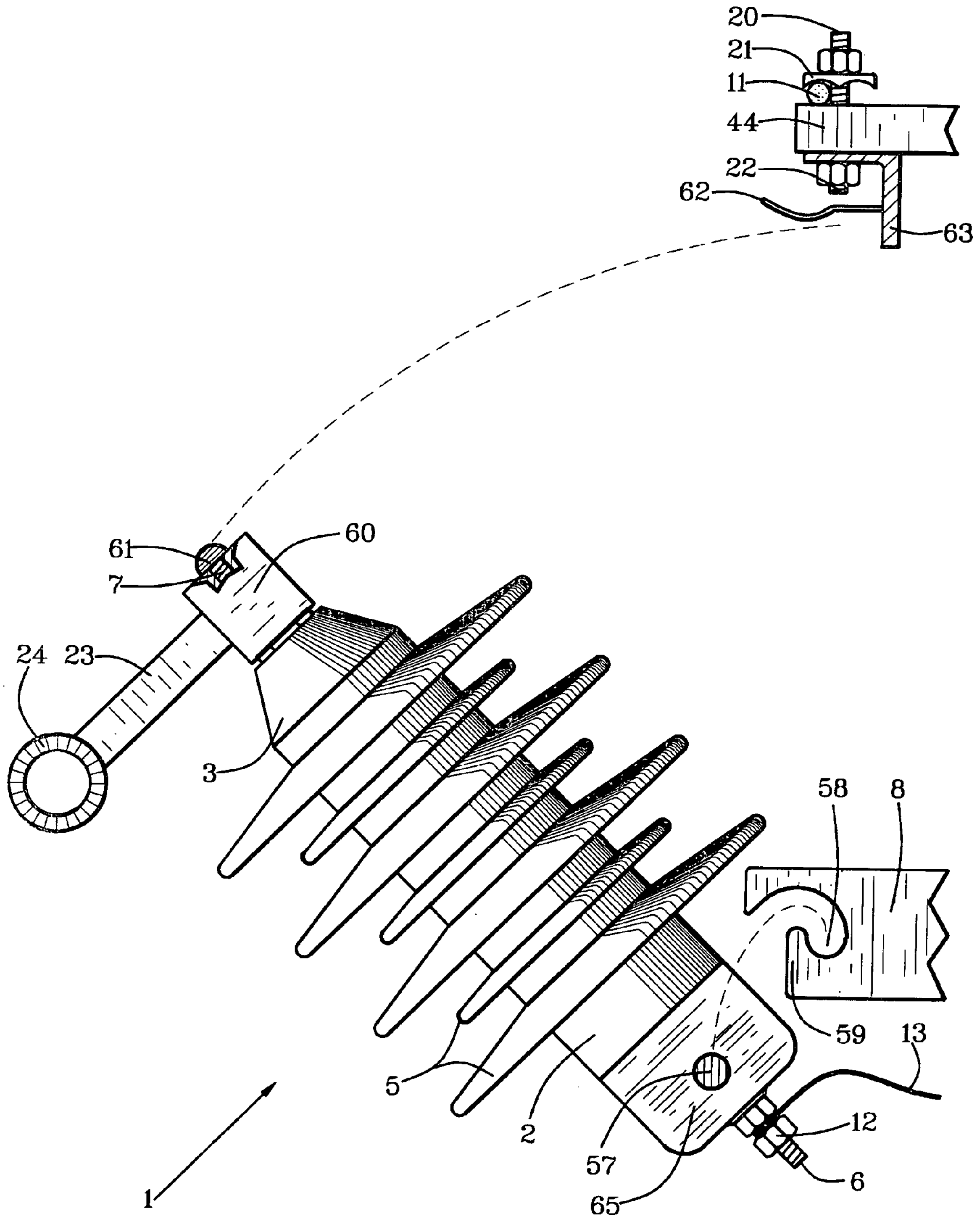
FIG. 17 is a partially cutaway side elevation view of an open mode of the switchable lightning-arrester system having the hinged safety switch on a hinge rod removed from the hinge bay for being either removed for discard by downward travel or replaced and closed by upward travel.

As shown in FIGS. 11-13, the slide rod 46 can include an outwardly opening length for positioning the connection insert 47 in a closed mode of the counter-lever safety switch 14 with the connection insert 47 in electrical communication with the terminal end 7 and the switch rod 22 by positioning of the control lever 23 and the lever-link rod 49 collinearly in line and for positioning the connection insert 47 outwardly in an opposite direction from the slide pillar 43 by optionally upward or downward pivoting of the control lever 23.

For controlling sliding travel of the slide rod 46, the switchable lightning-arrester system can further comprise a connector-side pillar groove 51 positioned circumferentially in an inside perimeter of the slide aperture 45 proximate a connector side of the slide pillar 43. A lever-side pillar groove 52 is positioned circumferentially in an inside perimeter of the slide aperture 45 proximate a lever side of the slide pillar 43 and a slide groove 53 is positioned in an outside periphery of the slide rod 46.

The slide groove 53 is articulated to receive a major cross-sectional portion of a toroidal resilient washer. The connector-side pillar groove 51 is articulated to receive a remaining minor cross-sectional portion of the toroidal resilient washer and the lever-side pillar groove 52 is articulated to receive the remaining minor cross-sectional portion of the toroidal resilient washer for restraining travel of the slide rod 46 from optionally open and closed modes of the counter-lever safety switch 14.

The switchable lightning-arrester system can further comprise a pillar stop 54 on the slide-fulcrum pillar 42 articulated and positioned for arresting downward travel of the control lever 23.

The switchable lightning-arrester system can further comprise a lever stop 55 on the control lever 23 that is articulated and positioned for arresting downward travel of the control lever 23.

Referring to FIGS. 14-19, for hinge-connection switching, the switchable lightning-arrester system can comprise the lightning arrester 1 having the base end 2, the power-line end 3 and the link bolt 4 positioned internally from arrester fins 5 of the lightning arrester 1. The link bolt 4 has the ground end 6 proximate the base end 2 and the terminal end 7 proximate the power-line end 3. The arrester-attachment base 8 is articulated for receiving the base end 2 of the lightning arrester 1 predeterminedly for attaching the lightning arrester 1 to the power-line support 9. The safety-switchable connector 10 is positioned proximate the power-line end 3 of the link bolt 4 for open and closed switching of electrical communication from the power line 11 to the link bolt 4. The safety-switchable connector 10 for this embodiment includes a hinged safety switch 56 having a hinge rod 57 proximate the base end 2 of the lightning arrester 1. The hinge rod 57 is positioned in a hinge bay 58 on the arrester-attachment base 8 for pivoting the lightning arrester 1 orthogonally to an axis of the hinge rod 57. The lightning arrester 1 is pivotal interchangeably between a closed mode of the hinged safety switch 56 with the terminal end 7 of the link bolt 4 in electrical communication with the switch rod 22 and an open mode of the hinged safety switch 56 with the terminal end 7 of the link bolt 4 being removed pivotally from the electrical communication with the switch rod 22.

The ground-line connector 12 proximate the ground end 6 of the link bolt 4 is articulated for connecting a ground line 13 to the link bolt 4.

The hinge bay 58 is bifurcated in bifurcation arms 59 extended from the arrester-attachment base 8. The terminal end 7 of the link bolt 4 is positioned in a handle base 60 from which the control lever 23 having the control-lever handle 24 is extended laterally for positioning the hinge rod 57 in and out of the hinge bay 58 and for pivoting the lightning arrester 1 to and from a closed mode of the hinged safety switch 56. The terminal end 7 can include a latch knob 61 that is latched with a spring latch 62 that is extended laterally from a latch stop connecter 63 that is in electrical communication with the switch rod 22 for communicating lightning current from the power line 11, through the switch rod 22, through the spring latch 62 and into the terminal end 7 of the link bolt 4. The latch stop connector 63 stops pivotal travel of the lightning arrester 1 beyond a position of electrical connection of the latch knob 61 with the spring latch 62.

The bifurcation arms 59 can include arcuate guides 64 for guiding a portion of the lightning arrester 1 containing the hinge rod 57 between the bifurcation arms 59 while the hinged safety switch 56 is being opened and closed with the control lever 23.

The base end 2 of the lightning arrester 1 has an attachable hinge-rod base 65 from which the hinge rods 57 are extended from opposite sides.

The hinged safety switch 56 can include a support connector 66 extended intermediate the arrester-attachment base 8 and the line-support platform 44.

Referring to FIGS. 20-25, for a pivotal connection, the switchable lightning-arrester system can include the lightning arrester 1 having the base end 2, the power-line end 3 and the link bolt 4 positioned internally from arrester fins 5 of the lightning arrester 1. The link bolt 4 has the ground end 6 proximate the base end 2 and the terminal end 7 proximate the power-line end 3. The arrester-attachment base 8 receives the base end 2 of the lightning arrester 1 predeterminedly for attaching the lightning arrester 1 to the power-line support 9. The safety-switchable connector 10 proximate the power-line end 3 of the link bolt 4 for open and closed switching of electrical communication from the power line 11 to the link bolt 4 includes a pivot safety switch 67 positioned on the power-line end 3 of the lightning arrester 1.

The pivot safety switch 67 has a connector base 68 that is attached detachably to the power-line end 3 of the lightning arrester 1. A support pillar 76 is extended orthogonally from the connector base 68 to the line-support platform 44.

A first connector boss 69 is extended predeterminedly from the connector base 68 in a direction towards the line-support platform 44. A second connector boss 70 is extended predeterminedly from the line-support platform 44 in a direction towards the connector base 68. A connector plug 71 is positioned removably in electrical communication with the first connector boss 69 and the second connector boss 70. The connector plug 71 is affixed to a pivot member 72 that is pivotal from a pivot axle 73 on a predetermined side of the first connector boss 69 and the second connector boss 70 for pivoting the connector plug 71 into and out from electrical communication with the first connector boss 69 and the second connector boss 70 selectively.

The first connector boss 69 is in electrical communication with the terminal end 7 of the link bolt 4. The second connector boss 69 is in electrical connection with the switch rod 22 for electrical communication with the power line 11.

Figure 20:
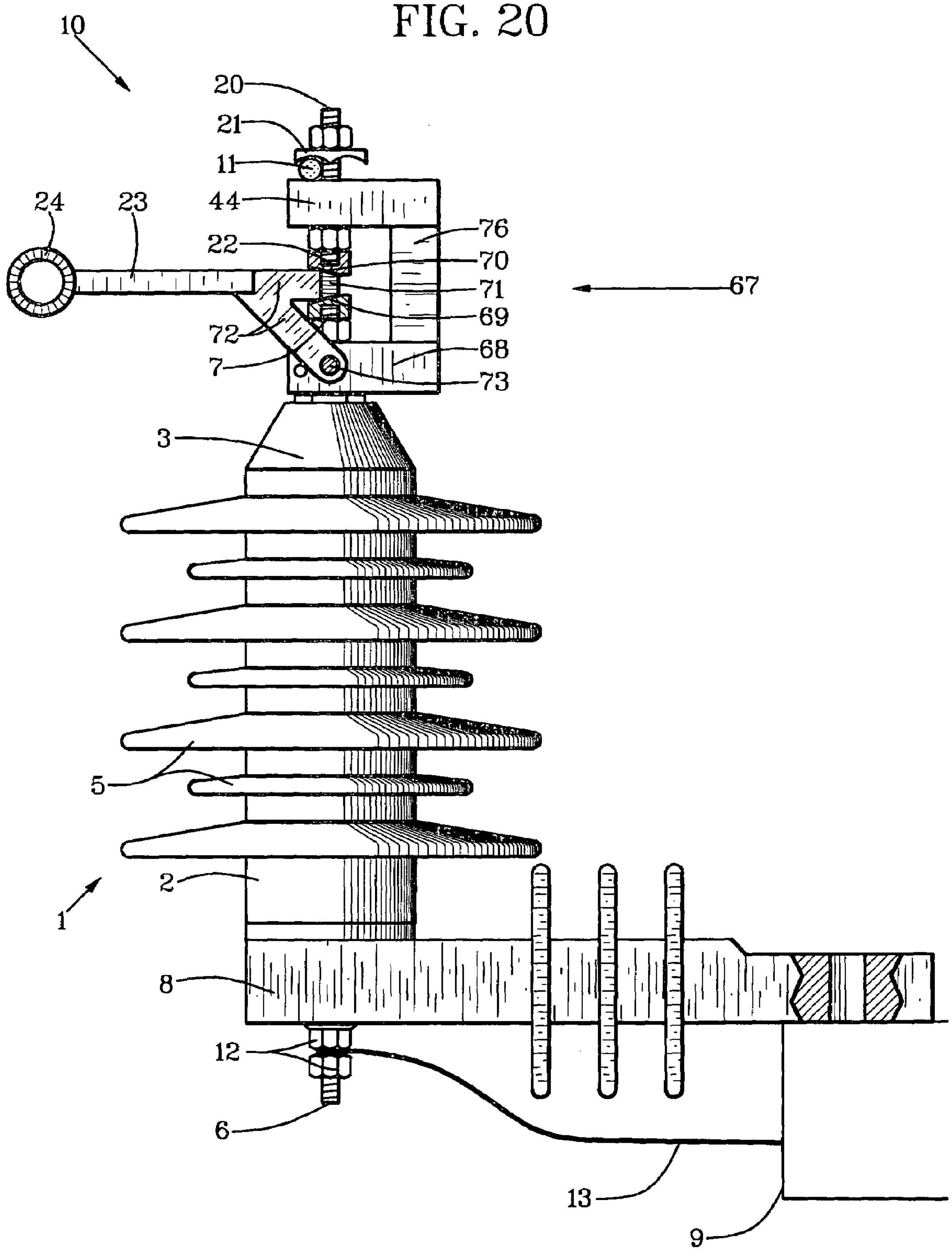
FIG. 20 is a partially cutaway side elevation view of a closed mode of a pivot-connector embodiment with a pivot axle on an arrester side of a pivotal connection.
Figure 21:
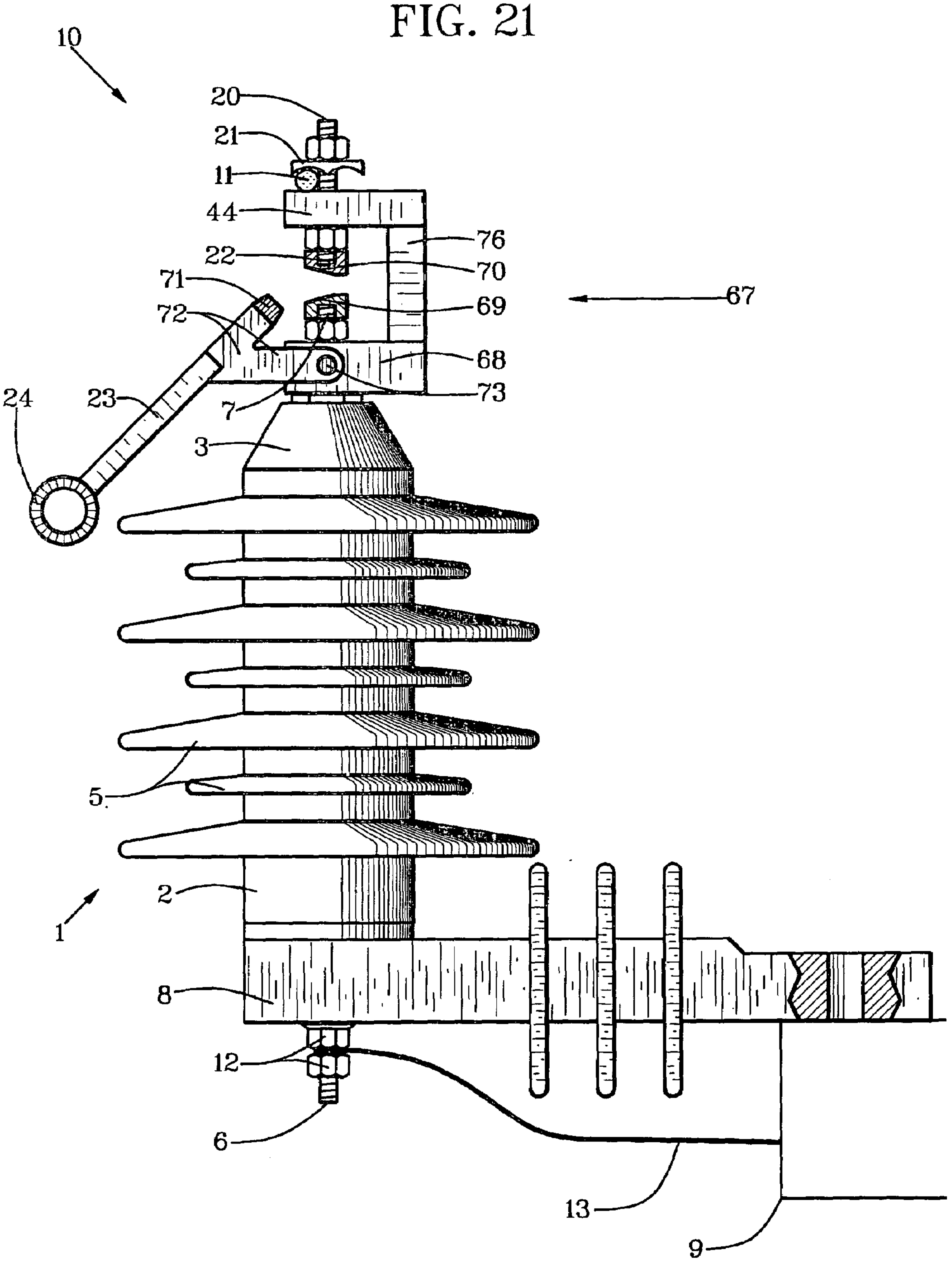
FIG. 21 is a partially cutaway side elevation view of an open mode of the FIG. 20 illustration.
Figures 22, 23:
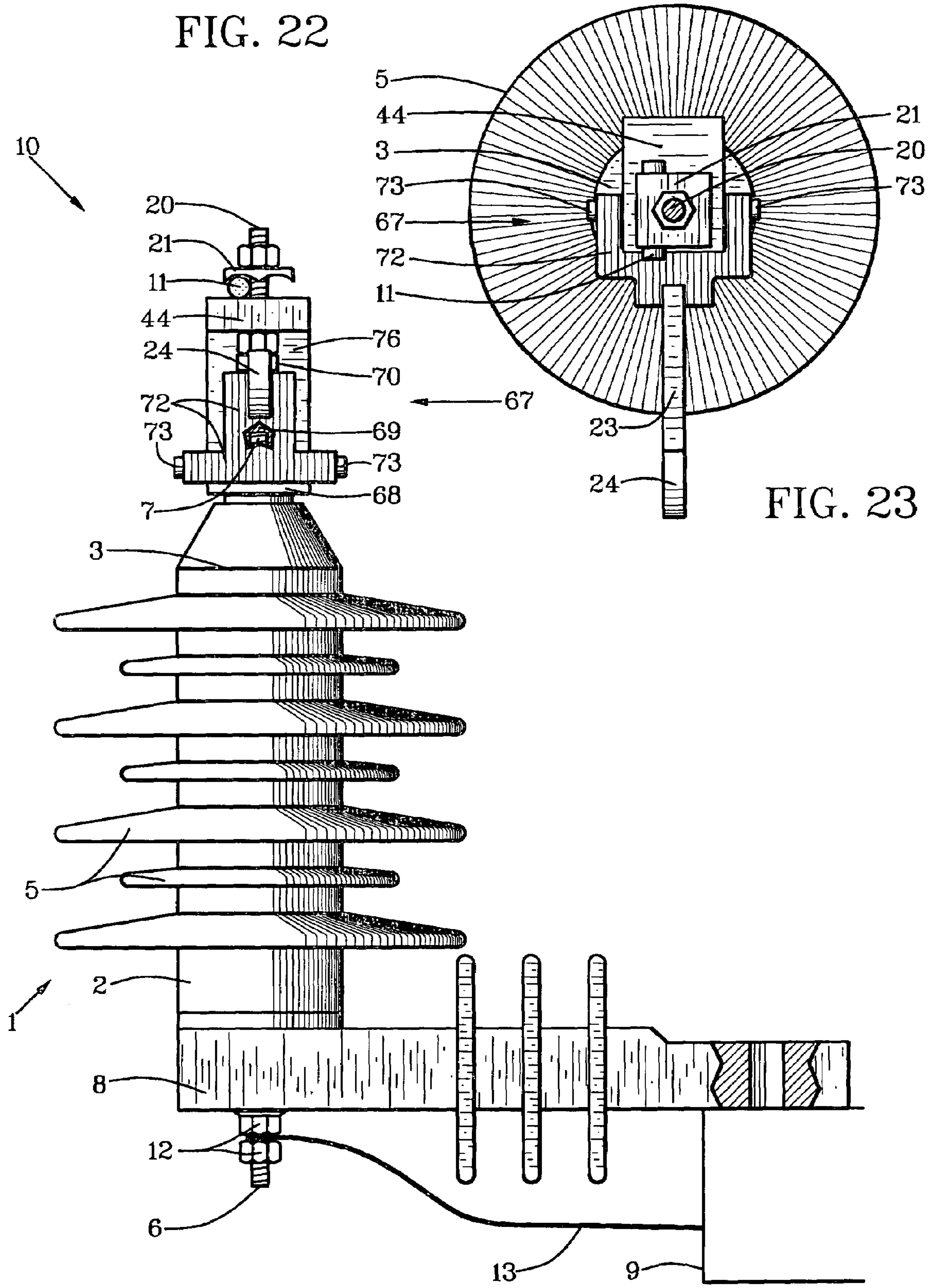
FIG. 22 is a partially cutaway front elevation view of the FIG. 20 illustration.
FIG. 23 is a top view of the FIG. 20 illustration.

As shown in FIGS. 20-21, the predetermined side of the first connector boss 69 and the second connector boss 70 on which the pivot member 72 is positioned can include a connector-base side with the pivot axle 73 positioned on the connector base 68 for pivoting the pivot member 72 in a direction towards the lightning arrester 1 for removing the connector plug 71 from intermediate the first connector boss 69 and the second connector boss 70.

Figures 24, 25:
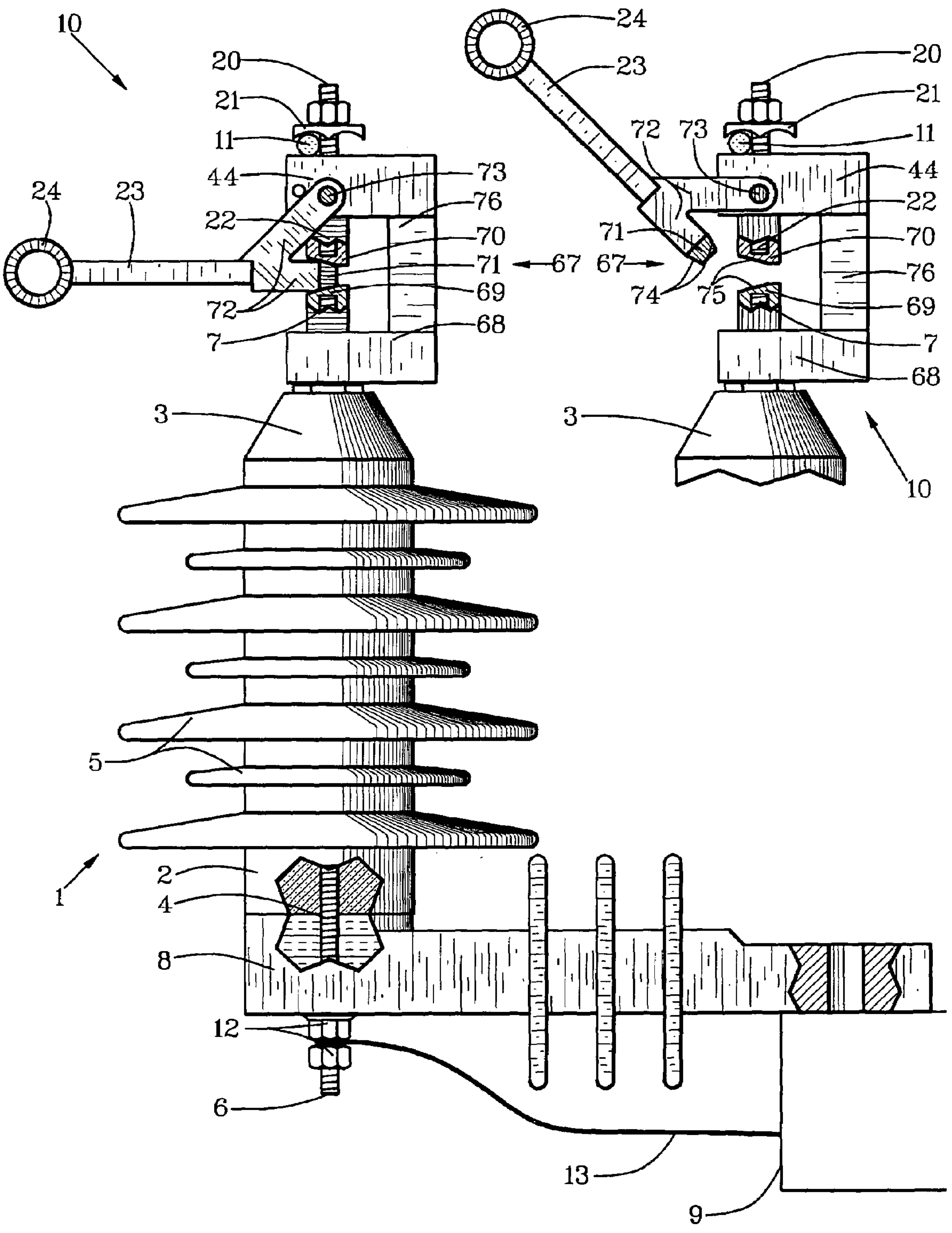
FIG. 24 is a partially cutaway side elevation view of a closed mode of the pivot-connector embodiment with the pivot axle on a line side of the pivotal connection.
FIG. 25 is a partially cutaway fragmentary side view of a top portion of an open mode of the FIG. 24 illustration.

As shown in FIGS. 24-25, the predetermined side of the first connector boss 69 and the second connector boss 70 on which the pivot member 72 is positioned can include a line side with the pivot axle 73 positioned on the line-support platform 44 for pivoting the pivot member 72 in a direction opposite from the lightning arrester 1 for removing the connector plug 71 from intermediate the first connector boss 69 and the second connector boss 70.

The pivot axle 73 is preferably but need not be in line with the an axis of the link bolt 4 and the switch rod 22. Being in line makes a better contact of the connector plug 71 with the first connector boss 69 and the second connector boss 70.

The connector plug 71 can include tapered sides 74 and the first connector boss 69 and the second connector boss 70 include tapered ends 75 that match taper of the tapered sides 74.

The pivot member 72 can include the control lever 23.

Referring further to FIGS. 20-25, the switchable lightning-arrester system can have the pivot safety switch 67 being attachable detachably to the terminal end 7 of the link bolt 4 proximate the power-line end 3 of the lightning arrester 1. The pivot safety switch 67 has the connector base 68 that is attached detachably to the power-line end 3 of the lightning arrester 1. The support pillar 76 is extended orthogonally from the connector base 68 to the line-support platform 44. The first connector boss 69 is extended predeterminedly from the connector base 68 in the direction towards the line-support platform 44. The second connector boss 70 is extended predeterminedly from the line-support platform 44 in the direction towards the connector base 68. The connector plug 71 is positioned removably in electrical communication with the first connector boss 69 and the second connector boss 70. The connector plug 71 is affixed to the pivot member 72 that is pivotal from the pivot axle 73 on a predetermined side of the first connector boss 69 and the second connector boss 70 for pivoting the connector plug 71 into and out from electrical communication with the first connector boss 69 and the second connector boss 70 selectively. The first connector boss 69 is in electrical communication with the terminal end 7 of the link bolt 4 and the second connector boss 69 is in electrical connection with the switch rod 22 for electrical communication with the power line 11.

As shown in FIGS. 20-21, the predetermined side of the first connector boss 69 and the second connector boss 70 on which the pivot member 72 is positioned can include the connector-base side with the pivot axle 73 positioned on the connector base 68 for pivoting the pivot member 72 in the direction towards the lightning arrester 1 for removing the connector plug 71 from intermediate the first connector boss 69 and the second connector boss 70.

As shown in FIGS. 25-25, the predetermined side of the first connector boss 69 and the second connector boss 70 on which the pivot member 72 is positioned can include the line side with the pivot axle 73 positioned on the line-support platform 44 for pivoting the pivot member 72 in the direction opposite from the lightning arrester 1 for removing the connector plug 71 from intermediate the first connector boss 69 and the second connector boss 70.

The pivot axle 73 is preferably but not necessarily in line with the an axis of the link bolt 4 and the switch rod 22 of the lightning arrester 1 to which the pivot safety switch 67 is attachable.

The connector plug 71 can include tapered sides 74 in combination with the first connector boss 69 and the second connector boss 70 which include tapered ends 75 that match taper of the tapered sides 74. The pivot member 72 can include the control lever 23.

What is claimed is:

1. A switchable lightning-arrester system comprising:

a lightning arrester having a base end, a power-line end and a link bolt positioned internally from arrester fins of the lightning arrester;

the link bolt having a ground end proximate the base end and a terminal end proximate the power-line end;

an arrester-attachment base for receiving the base end of the lightning arrester predeterminedly for attaching the lightning arrester to a power-line support;

a safety-switchable connector proximate the power-line end of the link bolt for open and closed switching of electrical communication from a power line to the link bolt;

the safety-switchable connector including a counter-lever safety switch having a switch platform to which the terminal end of the link bolt is attached;

a ground-line connector proximate the ground end of the link bolt for connecting a ground line to the line bolt;

a fulcrum pillar extending vertically upward from a pillar end of the switch platform;

a line-support arm attached pivotally to a support-arm axle proximate a top of the fulcrum pillar;

the line-support arm being extended from proximate a support-lever axle to a switch-rod end;

a power-line clamp on the switch-rod end is positioned vertically above the link bolt in a closed mode of a counter-lever connector;

a switch rod extending downward vertically from the line-support arm for contacting the terminal end of the link bolt in a closed mode of the counter-lever connector;

a support-arm axle positioned horizontally on the fulcrum pillar at a control-fulcrum distance upwardly from the switch platform;

a control lever having a control-lever handle attached pivotally to the fulcrum pillar with a control-lever axle;

a control-link rod having a first link-rod end attached pivotally to the line-support arm with a first link axle;

the control-link rod has a second link-rod end attached pivotally to the control lever with a second link axle;

the control-link rod is articulated and positioned intermediate the line-support arm and the control lever for transmitting downwardly locking force on the line-support arm from downward travel of the control lever and for transmitting upwardly unlocking force on the line-support arm from upward travel of the control lever as transmitted to the control-lever handle selectively; and the control-link rod transmits a lock-shut mode of the counter-lever safety switch with the switch being in contact with the terminal end of link bolt by positioning of the first link axle, the second link axle and the control-lever axle in a straight line for transmitting lightning power to the ground line for a use mode of the lightning arrester.

2. The switchable lightning-arrester system of claim 1 wherein:

the control-lever handle is articulated for hand-grasping and for selectively remote grasping with a control rod.

3. The switchable lightning-arrester system of claim 1 wherein:

the support-arm axle is positioned a predetermined distance in a direction away from the pillar end of the switch platform for causing a predetermined central-actuation slant of the control lever, below which opening of the counter-lever safety switch with upward travel of the switch rod is prevented by offsetting leverage.

4. The switchable lightning-arrester system of claim 1 and further comprising:

an open-lock aperture articulated and positioned in the control lever for receiving an open-lock pin for preventing downward travel of the control-link rod and thereby preventing unintended downward actuation of the control lever.

5. The switchable lightning-arrester system of claim 1 wherein:

the counter-lever safety switch includes a remote actuator intermediate the fulcrum pillar and the control lever for remote actuation of the control lever predeterminedly.

6. The switchable lightning-arrester system of claim 5 wherein:

the remote actuator includes a contraction-force spring in combination with the open-lock aperture that is articulated and positioned in the control lever for receiving the open-lock pin for preventing downward travel of the control-link rod and thereby preventing unintended downward actuation of the control lever by the contraction-force spring.

7. The switchable lightning-arrester system of claim 6 wherein:

the open-lock pin includes a remotely accessible pin ring.

8. The switchable lightning-arrester system of claim 5 wherein:

the remote actuator includes a remote-control motor having a linear-actuation bar extended from the remote-control motor to pivotal contact with the control lever for actuation of the linear-actuation bar outwardly in a direction away from the fulcrum pillar for opening and inwardly in a direction towards the fulcrum pillar for closing the counter-lever connector.

9. The switchable lightning-arrester system of claim 8 wherein:

the remote-control motor includes a wrench socket for rotation with a socket wrench.

10. The switchable lightning-arrester system of claim 8 wherein:

the remote-control motor includes a hand knob for hand rotation.

11. The switchable lightning-arrester system of claim 8 wherein:

the remote-control motor includes an electrical socket for receiving electrical current.

12. A switchable lightning-arrester system comprising:

a lightning arrester having the base end, the power-line end and the link bolt positioned internally from arrester fins of the lightning arrester;

the link bolt having the around end proximate the base end and the terminal end proximate the power-line end;

an arrester-attachment base for receiving the base end of the lightning arrester predeterminedly for attaching the lightning arrester to the power-line support;

the safety-switchable connector proximate the power-line end of the link bolt for open and closed switching of electrical communication from the power line to the link bolt;

the safety-switchable connector including a slide safety switch having a slide platform to which the terminal end of the link bolt is attached;

the ground-line connector proximate the around end of the link bolt for connecting the around line to the line bolt;

the slide-fulcrum pillar is extended vertically upward from the pillar end of the slide platform;

the slide pillar is extended vertically upward from the slide platform intermediate the slide-fulcrum pillar and the link bolt;

the line-support platform is attached pivotally to the top of the slide pillar;

the power-line clamp is attached to the top of the line-support platform with the switch rod for holding the power line;

the slide pillar has the slide aperture for receiving the slide rod having the connection insert on the first end and the slide-rod axle on the second end;

the connection insert is articulated to contact the bottom end of the switch rod and the terminal end of the link bolt for conveying lightning current to the lightning arrester;

the lever-link rod is positioned intermediate the slide rod and the control lever with the first end of the lever-link rod attached pivotally to the slide-rod axle and the second end of the lever-link rod attached pivotally to the control lever with the lever-link axle;

the control lever is attached pivotally to the slide-fulcrum pillar with the control-lever axle; and the switch rod is extended downward vertically from the line-support platform for contacting the connection insert with the slide safety switch being in the closed-circuit mode with the control lever oriented pivotally for sliding the slide rod in opposite directions selectively.

13. The switchable lightning-arrester system of claim 12 wherein:

the control-lever axle is positioned predeterminedly above the slide platform for allowing the control-lever to be pivoted with the control-lever handle being raised above the horizontal attitude of the control lever for sliding the slide rod and thereby moving the connection insert out of contact with the terminal end and the switch rod for breaking circuitry of the counter-lever safety switch or optionally with the control-lever handle being lowered below the horizontal attitude of the control lever for sliding the slide rod and thereby moving the connection insert out of contact with the terminal end and the switch rod for breaking circuitry of the counter-lever safety switch with the lever-link rod having the double-end pivotal contact with the slide rod and the control lever.

14. The switchable lightning-arrester system of claim 13 wherein:

the slide rod includes an inwardly opening length for positioning the connection insert in the closed mode of the counter-lever safety switch with the connection insert in electrical communication with the terminal end and the switch rod by positioning of the control lever and the lever-link rod collinearly in line and for positioning the connection insert inwardly towards the slide pillar by optionally upward or downward pivoting of the control lever.

15. The switchable lightning-arrester system of claim 13 wherein:

the slide rod includes an outwardly opening length for positioning the connection insert in the closed mode of the counter-lever safety switch with the connection insert in electrical communication with the terminal end and the switch rod by positioning of the control lever and the lever-link rod collinearly in line and for positioning the connection insert outwardly in an opposite direction from the slide pillar by optionally upward or downward pivoting of the control lever.

16. The switchable lightning-arrester system of claim 12 and further comprising:

a connector-side pillar groove positioned circumferentially in an inside perimeter of the slide aperture proximate the connector side of the slide pillar;

a lever-side pillar groove positioned circumferentially in an inside perimeter of the slide aperture proximate the lever side of the slide pillar; and a slide groove in an outside periphery of the slide rod.

17. The switchable lightning-arrester system of claim 16 wherein:

the slide groove is articulated to receive the major cross-sectional portion of the toroidal resilient washer;

the connector-side pillar groove is articulated to receive the remaining minor cross-sectional portion of the toroidal resilient washer; and the lever-side pillar groove is articulated to receive the remaining minor cross-sectional portion of the toroidal resilient washer for restraining travel of the slide rod from optionally open and closed modes of the counter-lever connector.

18. The switchable lightning-arrester system of claim 16 wherein:

the slide groove is articulated to receive the minor cross-sectional portion of the toroidal resilient washer;

the connector-side pillar groove is articulated to receive the remaining major cross-sectional portion of the toroidal resilient washer; and the lever-side pillar groove is articulated to receive the remaining major cross-sectional portion of the toroidal resilient washer for restraining travel of the slide rod from optionally open and closed modes of the counter-lever connector.

19. The switchable lightning-arrester system of claim 12 and further comprising:

a pillar stop on the slide-fulcrum pillar articulated and positioned for arresting downward travel of the control lever.

20. The switchable lightning-arrester system of claim 12 and further comprising:

a lever stop on the control lever articulated and positioned for arresting downward travel of the control lever.

21. A switchable lightning-arrester system comprising:

a lightning arrester having a base end, a power-line end and a link bolt positioned internally from arrester fins of the lightning arrester;

the link bolt having the ground end proximate the base end and a terminal end proximate the power-line end;

an arrester-attachment base for receiving the base end of the lightning arrester predeterminedly for attaching the lightning arrester to a power-line support;

a safety-switchable connector proximate the power-line end of the link bolt for open and closed switching of electrical communication from the power line to the link bolt;

the safety-switchable connector including a pivot safety switch positioned on the power-line end of the lightning arrester;

the pivot safety switch having a connector base that is attached detachably to the power-line end of the lightning arrester;

a support pillar extended orthogonally from the connector base to the line-support platform;

a first connector boss extended predeterminedly from the connector base in the direction towards the line-support platform;

a second connector boss extended predeterminedly from the line-support platform in the direction towards the connector base;

a connector plug positioned removably in electrical communication with the first connector boss and the second connector boss;

the connector plug being affixed to a pivot member that is pivotal from a pivot axle on the predetermined side of the first connector boss and the second connector boss for pivoting the connector plug into and out from electrical communication with the first connector boss and the second connector boss selectively;

the first connector boss being in electrical communication with the terminal end of the link bolt; and the second connector boss being in electrical connection with the switch rod for electrical communication with the power line.

22. The switchable lightning-arrester system of claim 21 wherein:

the predetermined side of the first connector boss and the second connector boss on which the pivot member is positioned includes the connector-base side with the pivot axle positioned on the connector base for pivoting the pivot member in the direction towards the lightning arrester for removing the connector plug from intermediate the first connector boss and the second connector boss.

23. The switchable lightning-arrester system of claim 21 wherein:

the predetermined side of the first connector boss and the second connector boss on which the pivot member is positioned includes the line side with the pivot axle positioned on the line-support platform for pivoting the pivot member in the direction opposite from the lightning arrester for removing the connector plug from intermediate the first connector boss and the second connector boss.

24. The switchable lightning-arrester system of claim 21 wherein:

the pivot axle is in line with the an axis of the link bolt and the switch rod.

25. The switchable lightning-arrester system of claim 21 wherein:

the connector plug includes tapered sides; and the first connector boss and the second connector boss include tapered ends that match taper of the tapered sides.

26. The switchable lightning-arrester system of claim 21 wherein:

the pivot member includes the control lever.

27. The switchable lightning-arrester system of claim 21 wherein:

the pivot axle is in line with the an axis of the link bolt and the switch rod of the lightning arrester to which the pivot safety switch is attachable.

28. The switchable lightning-arrester system of claim 21 wherein:

the pivot member includes the control lever.

29. A switchable lightning-arrester system comprising:

a pivot safety switch attachable to a terminal end of a link bolt proximate the power-line end of a lightning arrester;

the pivot safety switch having the connector base that is attached detachably to the power-line end of the lightning arrester;

a support pillar extended orthogonally from a connector base to a line-support platform;

a first connector boss extended predeterminedly from the connector base in a direction towards the line-support platform;

a second connector boss extended predeterminedly from the line-support platform in the direction towards the connector base;

a connector plug positioned removably in electrical communication with the first connector boss and the second connector boss;

the connector plug being affixed to a pivot member that is pivotal from the pivot axle on the predetermined side of the first connector boss and the second connector boss for pivoting the connector plug into and out from electrical communication with the first connector boss and the second connector boss selectively;

the first connector boss being in electrical communication with the terminal end of the link bolt; and the second connector boss being in electrical connection with the switch rod for electrical communication with the power line.

30. The switchable lightning-arrester system of claim 29 wherein:

the predetermined side of the first connector boss and the second connector boss on which the pivot member is positioned includes the connector-base side with the pivot axle positioned on the connector base for pivoting the pivot member in the direction towards the lightning arrester for removing the connector plug from intermediate the first connector boss and the second connector boss.

31. The switchable lightning-arrester system of claim 29 wherein:

the predetermined side of the first connector boss and the second connector boss on which the pivot member is positioned includes the line side with the pivot axle positioned on the line-support platform for pivoting the pivot member in the direction opposite from the lightning arrester for removing the connector plug from intermediate the first connector boss and the second connector boss.

32. The switchable lightning-arrester system of claim 29 wherein:

the connector plug includes tapered sides; and the first connector boss and the second connector boss include tapered ends that match taper of the tapered sides.

* * * * *